United States Patent

[11] 3,593,312

[72] Inventors Robert S. Barton
Salt Lake City, Utah;
Carl B. Carlson, Arcadia; Bobby A. Creech, Glendora; Benjamin A. Dent, Altadena; Erwin A. Hauck, Arcadia, Calif.

[21] Appl. No. 871,621
[22] Filed Nov. 14, 1969
[45] Patented July 13, 1971
[73] Assignee Burroughs Corporation
Detroit, Mich.
Continuation of application Ser. No. 668,460, Sept. 18, 1967, now abandoned.

[54] DATA PROCESSOR HAVING OPERAND TAGS TO IDENTIFY AS SINGLE OR DOUBLE PRECISION

25 Claims, 11 Drawing Figs.

[52] U.S. Cl. .......... 340/172.5
[51] Int. Cl. .......... G06f 7/00, G06f 9/00
[50] Field of Search .......... 340/172.5; 235/157

[56] References Cited

UNITED STATES PATENTS

| | | | |
|---|---|---|---|
| 3,351,917 | 11/1967 | Shimabukuro | 340/172.5 |
| 3,351,913 | 11/1967 | Pine | 340/172.5 |
| 3,331,056 | 7/1967 | Lethin et al. | 340/172.5 |
| 3,293,616 | 12/1966 | Mullery et al. | 340/172.5 |
| 3,286,236 | 11/1966 | Logan et al. | 340/172.5 |
| 3,251,042 | 5/1966 | King | 340/172.5 |
| 3,234,519 | 2/1966 | Scholten | 340/172.5 |
| 3,045,212 | 7/1962 | Johnson | 340/172.5 |

*Primary Examiner*—Gareth D. Shaw
*Attorney*—Christie, Parker and Hale

ABSTRACT: A data processor having a memory in which stacks of information are stored. The top two words of an information stack, currently being operated on, are stored in two registers external to memory. An extension register is provided for each of the aforementioned registers to allow the handling of double length information units. The operand words stored in the registers have tag bits as a part thereof which identify the operands as single or double word length information units. Control circuitry is responsive to the tag bits for causing the words to be automatically manipulated or handled as single or double word length information units. A processing unit processes the data stored in the registers.

INVENTORS
ROBERT S. BARTON
CARL B. CARLSON
BOBBY A. CREECH
BENJAMIN A. DENT
ERWIN A. HAUCK

BY Christie, Parker & Hale
ATTORNEYS.

DATA PROCESSOR HAVING OPERAND TAGS TO IDENTIFY AS SINGLE OR DOUBLE PRECISION

This application is a continuation of application Ser. No. 668,460, filed Sept. 18, 1967 and now abandoned.

BACKGROUND OF THE INVENTION

1. Field of the Invention

This invention relates to data processors and, more particularly, to digital data processors capable of operating on single or double word length information units.

2. Description of the Prior Art

Prior art data processors are known which read information from memory a word at a time but which are capable of operating on information units having either a single word or two words. Where each information unit has one word it is called "single precision," whereas when each has two words it is called "double precision." These data processors accumulate the single word or two words in registers external to the memory.

The prior art data processors are characterized in that information in the instruction itself identifies whether the information unit is a single or double precision and the circuits in the data processing system are responsive to the instruction to handle either a single word or a double word information unit. For example, if information is to be stored from registers into the memory under control of a store operator, the store operator will specify whether the information is a single word in length or a double word in length and the hardware is responsive to the instruction to cause either a single word or two words to be stored in memory.

Such prior art data processors suffer from the disadvantage that the programmer must keep track of the operand structure that he is working on. As a result, the programmer must specify in an instruction whether the information to be operated on is single or double precision. This places a considerable burden on the programmer and causes the program to be longer than it need be if this information were not carried in the program.

In contrast to the prior art, an embodiment of the present invention is a data processing system wherein each operand information unit has a tag which identifies it as single or double precision. The circuitry in this system is responsive to such tag within each operand for automatically handling the operand as either single or double word information units.

An important advantage of the present invention over the above-mentioned prior art system is that the programmer does not need to worry about the operand structure. The programmer merely writes his program as if the information were all single precision information and the circuitry in the system automatically handles the information in accordance with each instruction. If a particular operand is tagged as single precision, the circuitry merely handles a single word operand. If an operand is tagged as double precision, then two words are handled for such operand. Because of this feature, the programmer merely writes his program designating how data is to be operated on, for example, load registers or store information from the registers into memory or add, etc. The circuitry in the data processor, using the tags, automatically handles the data in the right manner.

Another advantage of the present invention is that it is easy to apply a program which has already been written to either single or double precision operands because the circuitry of the data processor automatically handles the information in accordance with the program without the need for special program instructions designating the information has single or double word in length.

SUMMARY OF THE INVENTION

Briefly, an embodiment of the present invention in a data processing apparatus includes a combination of register means for storing a first word and sometimes an extension word forming an information unit. Each information unit has a predetermined tag which identifies an extended word length information unit. Memory means is provided for storing information units from the register means, word by word. Also provided is means operative for transferring a single word between the register means and the memory means and which is also operative in response to said tag identifying an extended word length in an information unit for transferring an extension word between the register means and the memory means. In this manner an extended information unit is automatically stored into the memory means.

An embodiment of the invention also comprises a data processing apparatus having register means for storing a first word and an extension word of an information unit for processing. The information unit has as a part thereof a predetermined tag which identifies whether the corresponding information unit contains an extension word. Means is provided for processing a word stored in the register means and includes means responsive to a tag in an information unit identifying an extension word for automatically processing the extension word thereof. The extension word is processed together with the first word and in this manner a result is formed having a double word length.

These and other advantages of the present invention will be more fully understood with reference to the following description of an embodiment of the invention.

BRIEF DESCRIPTION OF THE DRAWINGS

FIG. 6 is a flow diagram illustrating the sequence of operation for the circuits shown in FIG. 2 while adjusting information in a stack preceding the execution of a "STORE operator;"

FIG. 7 is a detailed block diagram of the circuits shown in FIG. 1 for executing an "ADD operator," a "STORE operator" and a "LOAD operator;"

DESCRIPTION OF THE PREFERRED EMBODIMENT

Figure 1:
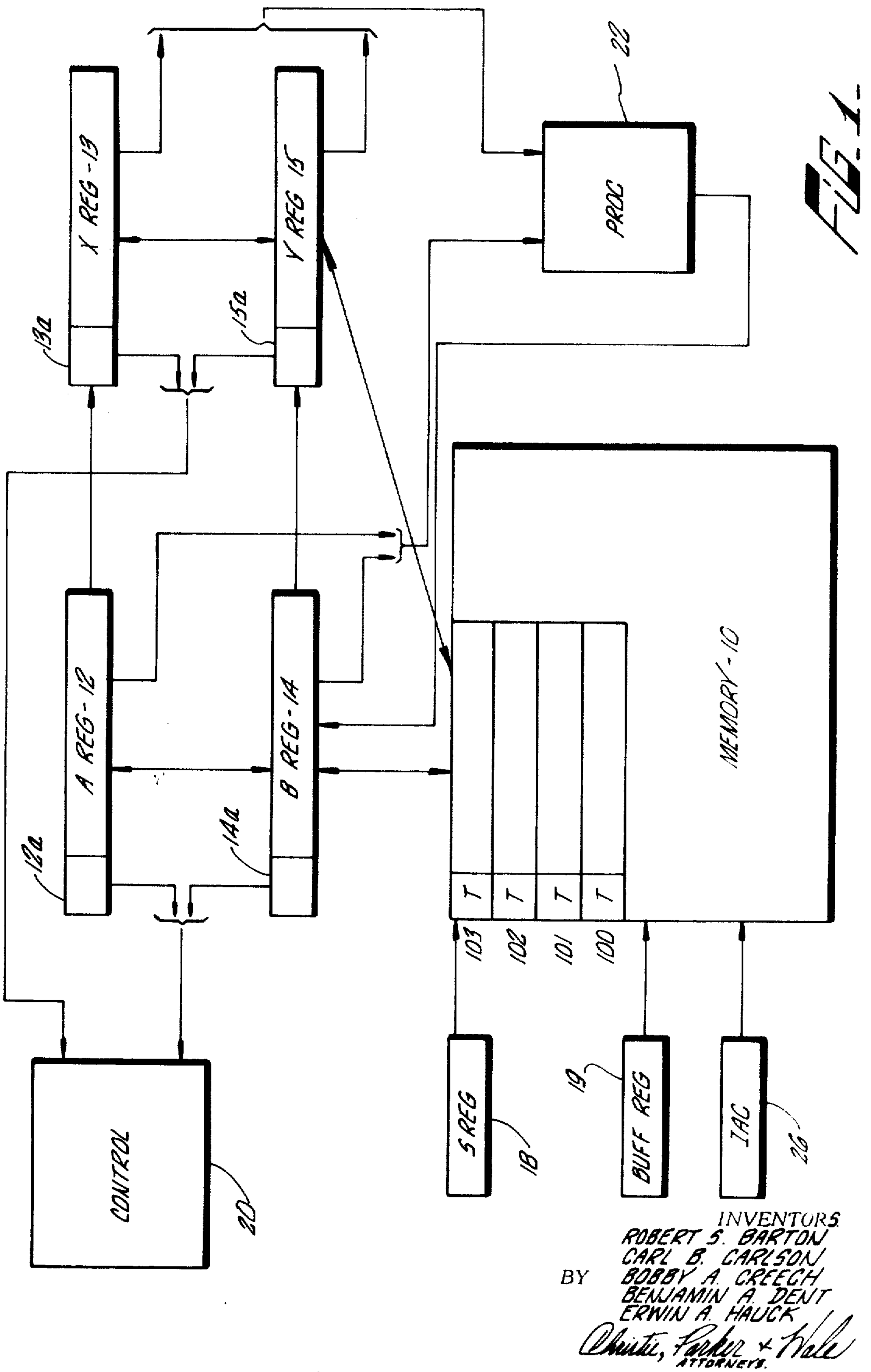
FIG. 1 is a general block diagram of a data processor and embodying the present invention.

Refer now to the general block diagram of the data processing apparatus shown in FIG. 1 and embodying the present invention. The preferred embodiment of the invention is in a computer system wherein information is handled in stacks. U.S. Pat. No. 3,200,379 filed in the name of P. D. King and assigned to the same assignee as the present invention describes a data processing system which utilizes the principles of a special form of algebraic notation, developed by the Polish mathematician J. Lukasiewicz, in which all parenthesis are eliminated by having the operator, such as add, multiply, etc., follow the operands involved in the operation. The result is then utilized as an operand in the same sequence. Implementation of this type of notation requires some temporary storage in which operands can be stored on a last in, first out, basis. Such a storage system has been referred to as a "stack" storage system because the operands can be considered as being placed in storage by stacking one on top of the other and then removing them in the reverse order, i.e. taking the operands off the top of the stack. The stack of information is partially stored in memory and partially stored in registers external to memory. Referring to FIG. 1, it will be noted that words of information are depicted as being stored in memory locations 100 through 103 of a memory 10. Two more words of the information in that particular stack are stored in an A register 12 and a B register 14. Information is read out of the memory 10 and stored in the memory 10 in words having a prefixed number of bits. Similarly, the information stored in the A and B registers have the same prefixed number of bits. Thus, the stack which is illustrated in FIG. 1 includes the words of information stored in memory locations 100 through 103 and the two words in the A and B registers. The A register is the top of the stack and the memory location 100 is the bottom of the stack. The other details of such a stack system are described in the above-identified U.S. Pat. No. 3,200,379.

Information is handled in units referred to as single precision or double precision. A single precision information unit is one which is one word in length. A double precision information unit is one which is two words in length. A word of a single precision information unit is stored in the B register 14 or the A register 12 and completely defines an information unit. Also single precision information is stored in the memory 10 with one word forming a complete information unit in each memory location. For example, if the stack in memory depicted in FIG. 1 contains a single precision word in memory location 103, a complete information unit is stored in memory location 103. If a double precision information unit is stored then, for example, one word would be stored in memory location 103 and the other in memory location 102. In the latter case, it takes both words in memory locations 102 and 103 to make up a complete double precision information unit.

The two words of a double precision information unit can be stored in either the B register 14 and Y register 15 or the A register 12 and an X register 13. One word is stored in each register.

The content of the B and Y registers form one complete double precision information unit and the content of the A and X registers form one complete double precision information unit. Since the memory stores one word in each memory location the two words making up a double precision information unit are stored in two consecutive memory locations with the least significant word of the two stored in the higher numbered memory location. For example, if double precision information is stored in the stack depicted in memory, the memory of FIG. 1, the first double precision information unit would have the most significant word stored in memory location 100 and the least significant word in memory location 101 and the second double precision information unit would have the most significant word stored in memory location 102 and the least significant in memory location 103.

An important aspect of the present invention is that each information unit itself has a "tag" which identifies whether the unit is a single precision information unit or a double precision information unit. Although the tag might be in each single precision word and in only the most significant word of each double precision word, the preferred embodiment of the invention has the tag placed in each operand word. Thus, in a double precision information unit there is a tag in each of the two words which identifies that that word is a part of a double precision information unit. Thus, each of the words stored in the stack in the memory 10 and each of the words stored in the A, B, X and Y registers has a "tag" which identifies whether that word is a part of a single precision information unit or a double precision information unit. The tags of the words are stored in sections **12*a*, 14*a*, 13*a*, 15*a* of the A, B, X and Y registers 12, 14, 13 and 15**, respectively.

An S register 18, a buffer register 19 and an instruction address counter 26 are used to address the memory 10 for reading and writing information therein. The S register is used to point at or address the top of the stack in the memory 10. The buffer register 19 is used to address other areas of memory from the stack area to bring in information words to the stack. The instruction address counter 26 keeps track of the address of the next operator to be executed.

Consider briefly the operation of the system shown in FIG. 1. For purposes of illustration the use of the tag bits for identifying the corresponding information unit as single or double precision is only described for three different types of operators, namely, an ADD operator, a LOAD operator, and a STORE operator. However, it will become evident that this novel invention can be applied to other types of operators as well. At the beginning of the execution of each of the aforementioned operators, information needs to be adjusted to the proper position in the stack of information. For example, at the beginning of an ADD operator, information is stored in both the A register 12 and the B register 14 and if the information is a double word length, then information is also stored in the X register 13 and Y register 15.

The process of adjusting the information in the stack at the beginning of execution of an operator is called the "stack adjust" operation. Assume that an ADD operator is being executed and that none of the registers A, B, X and Y contain information and consider the "stack adjust" operation.

Initially, the control unit causes a word of information to be read from the memory 10 and stored in the B register 14. The control unit 20 senses the tag stored in **14*a* and if the word is identified as a part of a single precision information unit the word is transferred up to the A register. If, on the other hand, the tag identifies the word in the B register as part of a double precision information unit, the word is transferred over to the Y register 15 and a second word is read out from memory and stored in the B register 14**.

Assuming for a moment that the information is a single precision information unit, the word is transferred from the B to the A register, then the control unit 20 causes the next word in memory to be read out and stored in the B register 14. A processing unit senses the single precision tag in **12*a* and 14*a* and adds the single precision information words stored in the A and B registers 12 and 14 and stores the result back into the B register 14**.

Assume now that the first word stored in the B register 14 is tagged in **14*a* as being a double precision information unit. The control unit 20 will sense the double precision tag in 14*a* and will cause the word to be transferred over to the Y register 15. The control unit also causes the second word of the double precision information unit to be read from the memory 10 and stored in the B register 14. Subsequently, the control unit 20 causes the two words stored in the B and Y registers to be transferred up to the A and X registers, respectively. The control unit 20 then causes another word to be read out and stored in the B register 14. The control unit 20 again looks at the tag contained in 12*b* and if the word is tagged as a double precision information unit, the word is transferred over to the Y register 15 and the second word of the information unit contained in the memory 10 is read out and stored in the B register 14**.

An ADD operator is being executed, therefore the control unit 20 senses the double precision tags in **12*a* and 14*a* and causes the processing unit 22 to add the content of X and Y together and store the result in the Y register. The control unit 20** then causes the processing unit to add the content of A and B together, taking into account any carry out from the Y register and store the result in the B register.

Therefore, it will be evident that the control unit 20 is controlled by the tags contained in the words stored in the A and B registers 12 and 14 and causes the information units to be properly adjusted in the registers and causes the processing unit 22 to process single or double precision information in accordance with the type of information identified by the tags.

When information is read out of memory and stored in the A and B registers it is referred to as adjusting the stack up. Information is also moved from either or both of the A and B registers into the memory. This is referred to as adjusting the stack down. Consider the situation where single precision information units are stored in the A and B registers and the stack is to be adjusted down. The control unit 20 senses the single precision tags and the word stored in the B register 14 is stored into memory. Subsequently, the control unit 20 causes the content of the A register 12 to be stored into the B register and then to be stored into memory. Assume now that the stack is to be adjusted down and the information in the A, B, X and Y registers is double precision. The control unit 20 senses the tags and determines that the information is double precision and then causes the word contained in the B register 14 to be transferred to the memory and subsequently the second word contained in the Y register 15 to be transferred to the memory. In this manner, the double word length information contained in the B and Y registers can be stored in consecutive memory locations of the memory unit 10.

Subsequently, the control unit 20 causes the information contained in the A and X registers to be transferred to the B and Y registers, respectively. Following this transfer the word stored in the B register 14 is stored into memory and then the word contained in the Y register is stored in memory as described above.

It should now be evident that the data processing system is responsive to the tags in the operands for automatically processing a single word or a double word information unit. Additionally, it should be evident that the stack adjusting circuitry is also responsive to the tag bits for automatically transferring a single or a double precision information unit between the registers and the memory as required, independently of the program instruction being executed.

Before giving a detailed description of the circuits, a brief explanation will be given of the symbols and where their meaning can be found. Table I is shown at the end of the detailed description. Table I shows each of the operators which are executed with an explanation of the operation required by the operator. Following Table I is Table II which shows a number of different symbols used in the figures along with an explanation of what is represented by each symbol. The symbols shown in Table II represent static conditions in the circuits. Following Table II is Table III. Table III is a list of action symbols. The action symbols represent certain dynamic operations which take place in the circuits shown in the Figures. Reference should be made to Tables I, II and III to determine the meaning of the symbols used in the figures.

Figure 2:
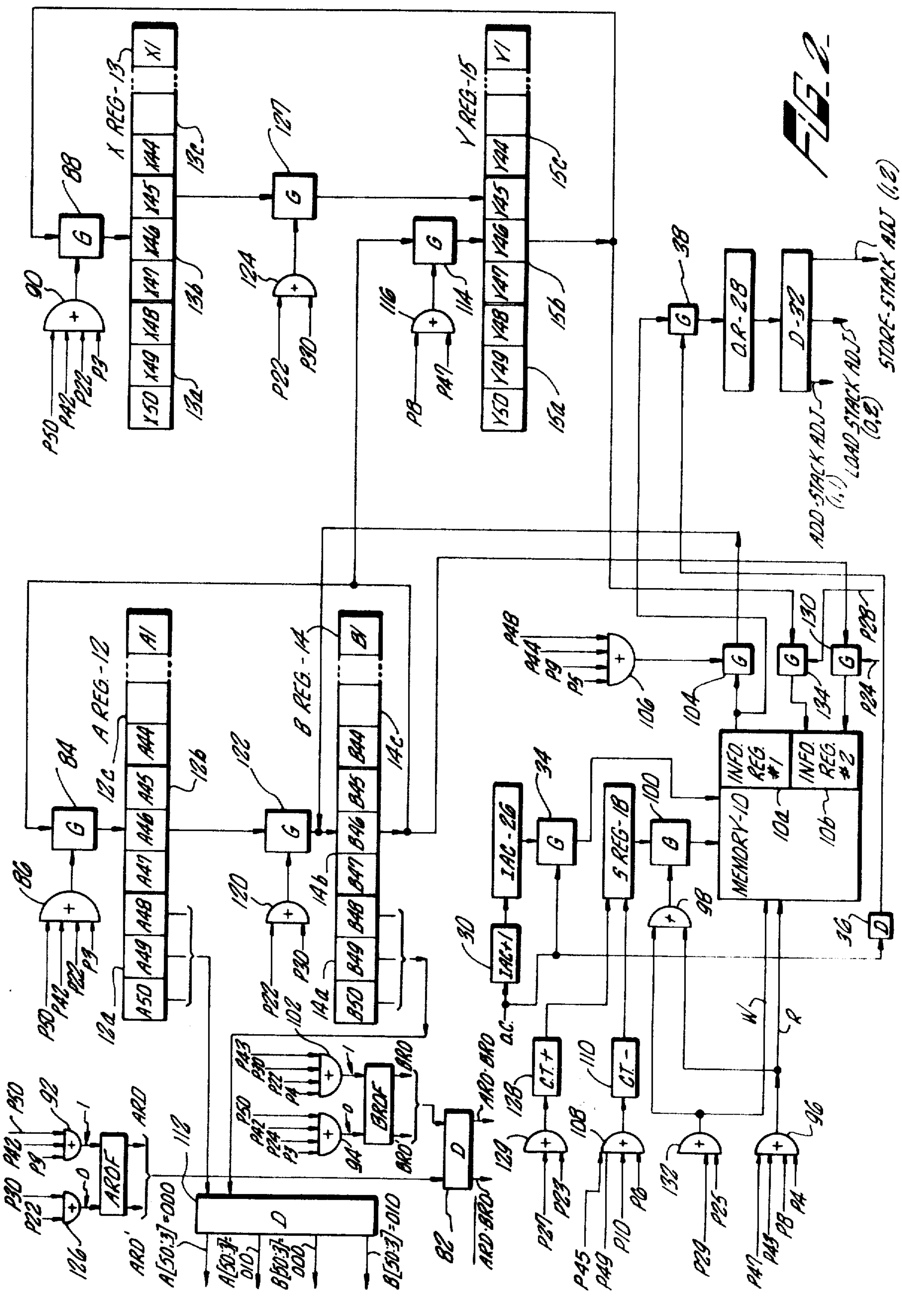
FIG. 2 is a more detailed block diagram of the embodiment of the present invention shown in FIG. 1 showing the stack adjusting circuitry.

Each of the three operators discussed herein require A, B, X and Y registers to be preloaded in a certain predetermined manner in order for the operator to be executed properly. A decoder 32 shown in FIG. 2 is the operator decoder. Symbols are used to reference the output circuits of the decoder 32 representative of each operator. Immediately underneath each of the operator symbols shown at the output of the decoder 32 is the symbol STACK ADJ ( ). The two numerals inside of the brackets represent the required condition of the A, B, X and Y registers. The first of the two numerals is indicative of the required condition of the A register (and X register if double precision) and the second numeral is indicative of the required condition of the B register (and the Y register if double precision).

Referring to Table III, it will be noted that the symbol STACK ADJ (1,1) indicates that the stack of information is to be adjusted until both the A and B registers (and the X and Y, if the information is double precision) are full of information. The symbol STACK ADJ (0,2) indicates that the stack is to be adjusted until A register (and the X register, if double precision) is empty but that the B and Y registers are to be disregarded as they can be full or empty. The symbol STACK ADJ (1,2) indicates that the stack is to be adjusted until the A register (and the X register, if double precision) is full, and the content of B and Y registers is to be disregarded. Thus, a "0" in the ( ) indicates the corresponding register is to be empty, a "1" indicates it is to be full and "2" indicates it can be full or empty.

Figure 3:
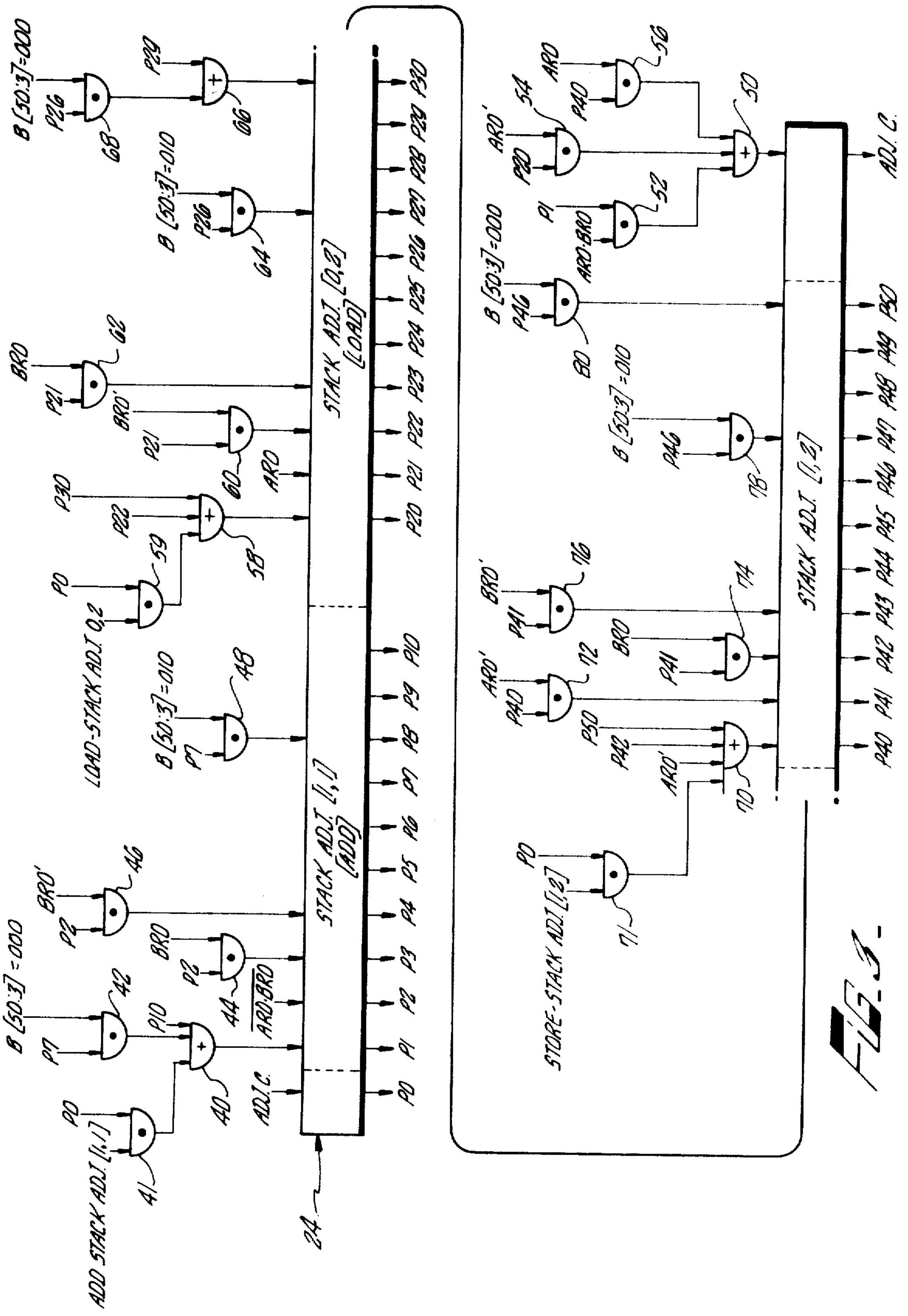
FIG. 3 is a block diagram of the control unit for the stack adjust circuitry shown in FIG. 2.

The following discussion is with respect to the circuits of FIG. 3. Certain output circuits are referred to which are not found in FIG. 3. These output circuits are from circuits such as decoders, and flip-flops shown in FIG. 2 which will be discussed in detail hereafter. These outputs are referenced by symbols, which, except for the outputs of the AROF and BROF flip-flops, are shown and explained in Tables I, II and III.

Figure 4:
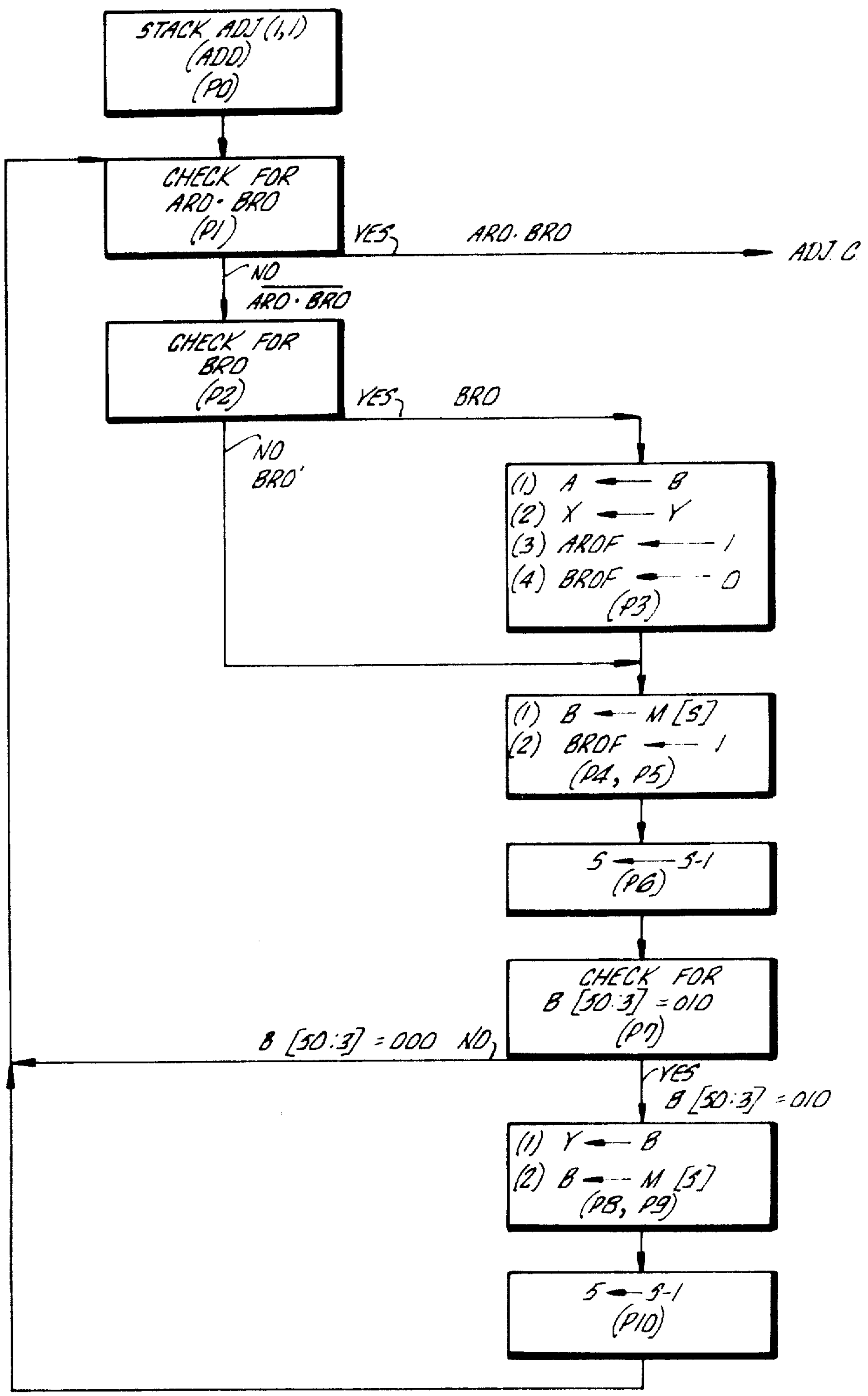
FIG. 4 is a flow diagram illustrating the sequence of operation for the circuits shown in FIG. 2 while adjusting information in a stack preceding the execution of a "ADD operator;"

Consider now the detailed circuits involved and their operation in carrying out the various STACK ADJ ( ) operations. The STACK ADJ ( ) operation takes place before an operator is executed. The operation of the computer system for each different STACK ADJ ( ) is shown in the flow diagrams of FIGS. 4, 5 and 6. It will be noted that the lower portion of each block in the flow diagram contains a symbol P followed by a numeral. These symbols refer to the output circuits of the control counter 24 shown in FIG. 3 which receive a control signal at that point in the flow. The flow diagrams of FIGS. 4, 5 and 6 should be referred to in the following description of the control circuits of FIG. 3 as they symbolically describe the sequence of the operation of the control counter.

Refer to the control circuits for the STACK ADJ ( ) operations which are shown in FIG. 3. Initially the control counter 24 is always in state "0" providing a control signal at PO. The control counter 24 is set to state "0" in response to a control signal at the ADJ.C. output circuit thereof which receives a control signal after one of the STACK ADJ ( ) operations is complete. The control counter 24 has a unique state called the "adjust complete" state during which the control signal is formed at the ADJ.C. output. When the control counter 24 is in state "0" it can be set to any one of three different states, namely, state "1," state "20" or state "40," depending on the particular STACK ADJ ( ) operation required for an operator.

First consider the control counter 24 and associated circuits when an ADD operator is decoded requiring a STACK ADJ (1,1) operation. Reference should be made to the flow diagram of FIG. 4 and FIG. 3 in the following discussion. An OR gate 40 and an AND gate 41 are responsive to the coincidence of control signals at the ADD–STACK ADJ (1,1) and P0 outputs to set the control counter 24 into state "1" where a control signal is formed at the P1 output circuit. This initiates the operation for a STACK ADJ (1,1). The control counter 24 is also reset into state "1" when in state "7" if a control signal is formed at B[50:3]=000 output. To be explained in more detail, a control signal is formed at the B[50:3]=000 output by the circuits of FIG. 2 when the tag of the word contained in the B register identifies the information as single precision (see Table II). To this end an AND gate 42 is responsive to the coincident of a control signal at P7 and B[50:3]=000 to apply a control signal to the OR gate 40 which, in turn, causes the control counter 24 to reset to state "1." The OR gate 40 also is responsive to a control signal at the P10 output when the counter is in state "10" to cause the counter to be reset to state "1."

When both the $\overline{\text{AROF}}$ and $\overline{\text{BROF}}$ flip-flops are in state "0," a control signal is formed at the output circuit ARO·BRO of FIG. 2. A control signal at ARO·BRO output causes the control counter 24 to count from state "1" to state "2."

An AND gate 44 is responsive to the coincidence of control signals at the P2 and BRO output circuits to count the counter from state "2" to state "3."

An AND gate 46 sets the counter from state "2" to state "4" in response to the coincidence of control signals at the P2 and BRO' output circuits. After the counter is in state "4" it automatically counts to states "5," "6" and "7" in sequences providing control signals at the P5, P6 and P7 output circuits. An AND gate 48 is responsive to the coincidence of control signals at the P7 and B[50:3]=010 outputs for setting the control counter from state "7" into state "8." To be explained, the circuits of FIG. 2 apply a control signal at the B[50:3]

=010 output circuit whenever the word contained in the B register is double precision information (see Table II).

Following state "8" the control counter automatically counts to states "9" and "10" and then back to state "1" causing control signals at the P9 and P10 output circuits in sequence.

Connected to the control counter 24 is an OR gate 50 which has three AND gates 52, 54 and 56 connected to the input thereof. The OR gate 50 causes the control counter 24 to be set into an "adjust complete" state where a control signal is formed at the ADJ.C. output. This occurs whenever one of the STACK ADJ ( ) operations is completed. Referring to the STACK ADJ(1,1) operation, an AND gate 52 applies a control signal to the OR gate 50 causing the control counter 24 to be set to the adjust complete state in response to a coincidence of control signals at ARO·BRO and P1 output circuits.

Once the control counter 24 is in the "adjust complete" state forming a control signal at the ADJ.C. output, it automatically counts to state "0" where a control signal is formed at the P0 output.

Consider now the circuits and operation involved of the control counter 24 for a STACK ADJ (0,2) operation. An OR gate 58 and an AND gate 59 are responsive to the coincidence of control signals at the LOAD-STACK ADJ (0,2) P.O. outputs for setting the control counter 24 into state "20" where a control signal is formed at the P20 output. This initiates the STACK ADJ (0,2) operation. The OR gate 58 also resets the control counter 24 into state "20" in response to control signals at the P22 and P30 output circuits. Once in state "20" the control counter 24 is set into state "21" and forms a control signal at P21 in response to a control signal at the ARO output.

Figure 5:
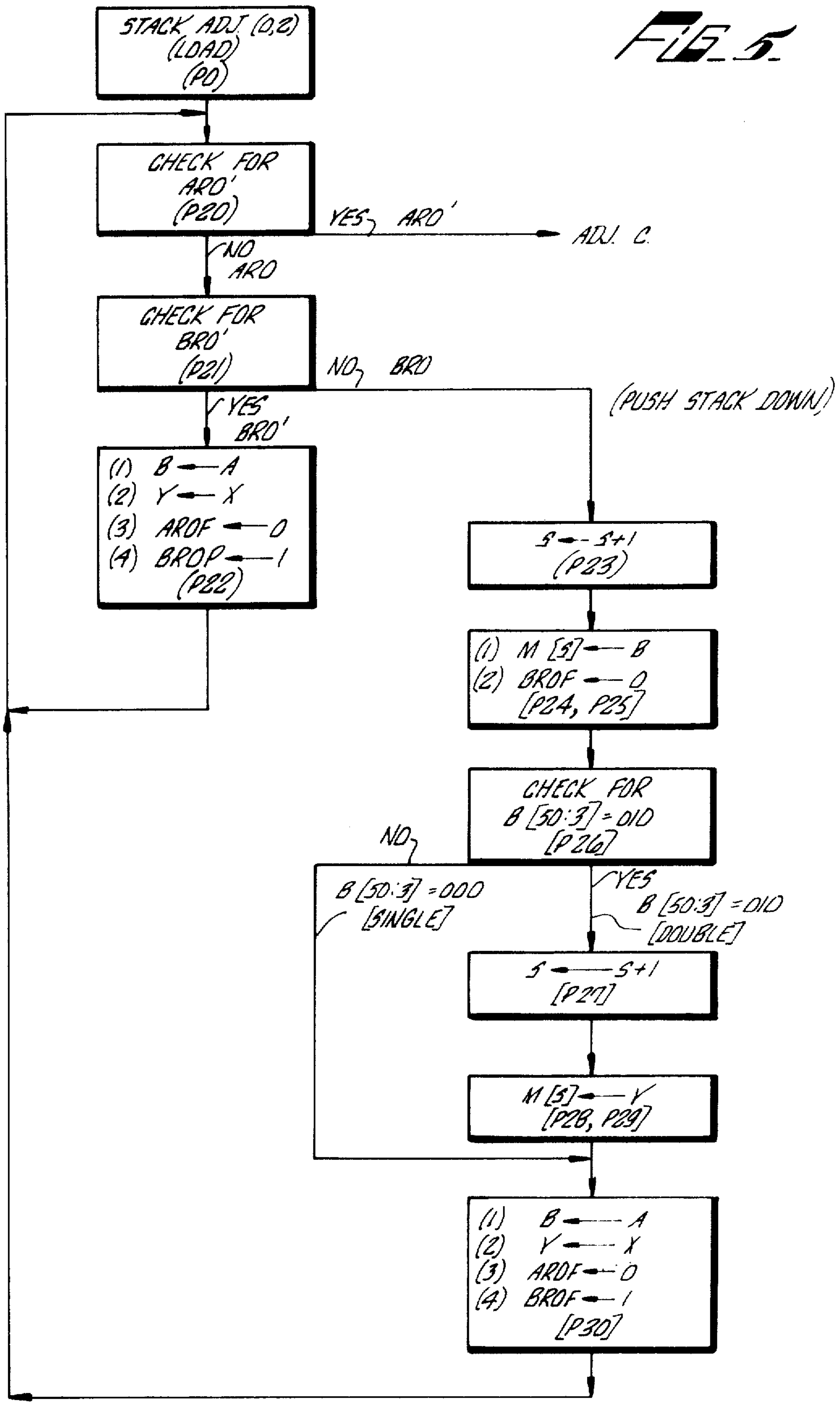
FIG. 5 is a flow diagram illustrating the sequence of operation for the circuits shown in FIG. 2 while adjusting information in a stack preceding the execution of a "LOAD operator;"

Referring to FIG. 5, it will be noted that the control counter 24 can either go from state "21" (P21) to either state "22" or state "23" (P22 or P23). An AND gate 60 is responsive to control signals at P21 and at BRO' output circuits for setting the control counter 24 into state "22." An AND gate 62 is responsive to the coincidence of control signals at the P21 and BRO output circuits for setting the control counter 24 into state "23." Once in state "23" the control counter 24 automatically counts to states "24", "25" and "26" forming control signals at the P24, P25 and P26 outputs.

In state "26" the control counter 24 may go either to state "30" or state "27". An AND gate 64 is responsive to the coincidence control signals at P26 and B[50:3]=010 for setting the control counter 24 into state "27" causing a control signal at P27. An OR gate 66 is connected to an AND gate 68. The AND gate 68 causes the OR gate 66 to apply a control signal and set the control counter from state "26" into state "30" in response to the coincidence of control signals at P26 and B[50:3]a=000. The OR gate 66 also causes the control counter 24 to be set to state "30" in response to a control signal at the P29 output circuit.

Returning for a moment to state "27," the control counter 24 is operative for automatically counting to states "28" and "29" following state "27" and, as described hereinabove, the counter is set into state "30" by a control pulse at P29. The control signal at P30 causes the OR gate 58 to reset the counter into state "20" as described hereinabove. When in state "20" and a control signal is formed at the P20 output and at the ARO' output, the AND gate 54 causes the gate 50 to set the control counter 24 to the "adjust complete" state.

Consider now the STACK ADJ (1,2) operation. This operation takes place at the beginning of the execution of a STORE operator. Reference should be made to the flow diagram of FIG. 6 and the circuit diagram of FIG. 3 during the following discussion. The coincidence of control signals at the STORE-STACK ADJ (1,2) and P0 outputs cause an AND gate 71 and an OR gate 70 to set the control counter 24 from state "0" to state "40" and form a control signal at the P40 output. When in state "40" the control counter can either branch to the "adjust complete" or go to state "41." An AND gate 77 is responsive to the coincidence of control signals at the P40 and ARO' outputs for setting the control counter 24 to state "41." The AND gate 56 causes the gate 50 to set the control counter 24 to the "adjust complete" state in response to the coincidence of control signals at the P40 and ARO output circuits.

When in state "41" the control counter can either go to state "42" or to state "43." An AND gate 74 is responsive to the control signal at the P41 and BRO outputs for setting the control counter 24 from state "41" to state "42." An AND gate 76 is responsive to the coincidence of control signals at the P41 and BRO' outputs for setting the control counter from state "41" to state "43." Once the control counter 24 is in state "43" it automatically counts to states "44," "45," and "46" providing control signals at the P44, P45 and P46 output circuits.

With the control counter in state "46" it can either go to state "47" or to state "50." An AND gate 78 is responsive to the coincidence of control signals at the P46 and B[50:3]=010 outputs for setting the control counter 24 from state "46" into state "47."

An AND gate 80 is responsive to the coincident of control signals at the P46 and B[50:3]=000 outputs for setting the control counter 24 from state "46" to state "50."

Returning to state "47," once the counter is in state "47" it automatically counts to states "48" and "49" in sequence and then on to state "50."

With the structure and operation of the control counter 24 of FIG. 3 in mind, consider the details of and the operation of the circuits shown in FIG. 2 while carrying out the STACK ADJ (1,1) operation for an ADD operator. These circuits are sequenced by and controlled by the control counter of FIG. 3.

The A, B, X and Y registers are shown again in FIG. 2, together with the memory and are referenced by the same symbols as used in FIG. 1. Each of the registers A, B, X and Y have 50 flip-flops referenced by the symbols A1 through A50, B1 through B50, X1 through X50 and Y1 through Y50, respectively. Referring to the A register 12, the flip-flops A48, A49 and A50 store the tag bits for the word stored into the A register and are referenced by the symbols *12a*. The flip-flops A1 through A44 of the A register store the mantissa of a word and are referenced by the symbol *12c*. The flip-flops A45, A46 and A47 of the A register store the exponent of the mantissa and are referenced by the symbol *12b*. When the tag bits stored in *12a* indicate that the word is a single precision word, the exponent in *12b* is the exponent of the mantissa contained in *12c*. When the tab bits in *12a* indicate that the corresponding information unit is a double precision information unit, the exponent in *12b* is the exponent of the mantissa in *12c* and of the mantissa stored in the X register 13.

Similar to the A register 12, the B register 14 and X register 13 and Y register 15 have tag flip-flops B48 through B50, X48 through X50 and Y48 through Y50, respectively, and are collectively represented by the symbols *14a*, *13a* and *15a*, respectively. Also, similar to the A register, the B, X and Y registers have flip-flops for storing the mantissas of words contained therein, which flip-flops are represented by the symbols B1 through B44, X1 through X44 and Y1 through Y44, respectively, and are collectively represented by the symbols *14c*, *13c* and *15c*, respectively. Also similar to the A register, the B register has flip-flops for storing the exponents of the mantissas, which flip-flops are represented by the symbols B45, B46, B47. The flip-flops storing the exponent in the B register are collectively represented by the symbol *14b*. The flip-flops of the A, B, X and Y flip-flops are conventional flip-flop circuits are well known in the computer art.

The memory 10 is a magnetic core memory having two information registers, *10a* and *10b*. The information register *10a* is the register in which all information being read out of the memory 10 is stored. The information register *10b* is the register in which all information being stored into the memory 10 is stored from the other circuits in the system prior to being written into the memory. Memory 10 is a word oriented memory in which a complete word consisting of 50 bits of information is read out in parallel or written in parallel. The memory 10 has its own timing and control circuits for causing read and write operations therein. Such read and write control circuits are well known in the computer art.

Associated with the memory 10 is an S register 18. The S register 18 is an address register for the memory 10 which is used for addressing during the stack adjust operations and during reading and writing in the stack.

Associated with the A and B registers are two flip-flops which identify whether the corresponding register is full of information or is empty. The AROF flip-flop is used to mark the A register as full or empty. The BROF flip-flop marks the B register as full or empty. The "1" state of the AROF and BROF flip-flops indicate the corresponding register is full, whereas the "0" state marks the corresponding register as empty. The output circuits of the AROF and BROF flip-flops which receive a control signal when the corresponding flip-flop is in a "1" state is represented by symbols ARO and BRO, whereas the output circuits which receive a control signal when the corresponding flip-flops are in a "0" state are represented by the symbols ARO′ and BRO′.

The memory 10 is shown coupled to an instruction address counter 26 and an S register 18. The instruction address counter 26 addresses the memory 10 causing operators to be read out and stored into an operator register 28. The operator register 28 is the primary register in the system for storing the program operators.

The instruction address counter 26 has gating circuits 30 connected thereto which cause the address contained therein to be counted up by one unit each time a control signal is applied to an operation complete line (OC). To be explained in more detail, the operation complete line (OC) is connected to one of the output circuits of a control counter shown in FIG. 8 which sequences the operation of the system during the execution of the operators stored in the operator register 28.

Although a computer system embodying the present invention may execute many different operators, an explanation is given of the circuits for only executing three operators, namely, an ADD operator, a LOAD operator and a STORE operator. The decoding circuit 32 mentioned above, is connected to the operator register 28 and generates a control signal at one of three output circuits. The three output circuits are referenced by symbols ADD-STACK ADJ (1,1), LOAD-STACK ADJ (0,2) and STORE-STACK ADJ (1,2) corresponding to the three different operators being described. The output circuit of the decoder 32 which receives a control signal corresponds to the operator stored in the operator register 28. The output circuits of the decoder are connected to the input of the control counter 24 as discussed above.

Before describing the rest of the circuits of FIG. 2 in detail, consider the operation of the circuits 10, 26, 28, 30 and 32 shown in FIG. 2. A control signal on the operation complete (OC) line causes the gating circuit 30 to count the instruction address counter 26 up one address and causes a gate 34 to couple the incremented address to the memory 10. The control signal on the operation complete line also applies a control signal to the read input line (R) to the memory 10 causing it to go through a read cycle and read out a stored operator. The operator is stored in the information register 10*a*. A delay circuit 36 is also responsive to the control signal on the operation complete (OC) line and applies a control signal to a gate 38, after the operator is stored in 10*a*, causing the operator to be stored into the operator register 28. The decoder 32 then decodes the operator and applies a control signal on the appropriate output circuit causing such signal to be applied to the control counter 24.

The memory 10 automatically rewrites the word contained in register 10*a* back into the same memory location from which it was read in a manner well known in the computer art so as to preserve the information for later use.

Consider the operation of the rest of the circuits of FIG. 2 during the STACK ADJ ( ) operations and assume initially that an ADD operator is stored in the ORDER register 28 causing the decoder 32 to form a control signal at the ADD-STACK ADJ (1,1) output as described hereinabove. Reference should be made in the following discussion to the flow diagram of FIG. 4 as well as FIG. 2. The control counter 24 steps from state "0" into state "1" and a control signal is formed at the P1 output. During this time a check is made to see if the A and B registers are full which exists when both the AROF and BROF flip-flops are in a "1" state causing control signals at both the ARO and BRO outputs. The decoding circuit 82 is coupled to the AROF and BROF flip-flops and provides a control signal at an output ARO·BRO when both flip-flops are in a "1" state and at the output $\overline{ARO \cdot BRO}$ when either the AROF or the BROF flip-flops are in a "0" state. When both the AROF and BROF flip-flops are in a "1" state, the STACK ADJ (1,1) operation is complete and the control counter 24 is set into the "adjust complete" state forming a control signal at the ADJ.C. output. If, on the other hand, either one or both of the AROF or BROF flip-flops is in a "0" state, then the STACK ADJ (1,1) operation is not complete and the control counter 24 goes on to state "2" forming a control signal at the P2 output.

During state "2" of the control counter 24, a check is made to see if the BROF flip-flop is in a "1" state, indicating that the B register 14 contains information. Under these conditions a control signal is formed at the BRO output. If the B register is full and a control signal is formed at the BRO output, the counter 24 goes from state "2" to state "3." If, on the other hand, the B register is empty and a control signal is formed at the BRO′ output, the control counter 24 goes from state "2" to state "4."

Assume now that the B register is full and a control signal is formed at the BRO output causing the control counter to go to state "3." During state "3" the content of the B register is transferred to the A register and the content of the Y register is transferred to the X register. In this manner, information contained in the stack in the B register is moved from the B register and Y register up to the A register and the X register. If the information happens to be single precision information then the information transferred from Y to X is disregarded. If, on the other hand, the information is double precision then the information transferred from the Y register to the X register is significant and will be used in the subsequent ADD operation. Also during state "3," the AROF flip-flop is set to state "1" to indicate that the A register is now full and the BROF flip-flop is set to a "0" state indicating that the B register is now empty.

Consider the circuits shown in FIG. 2 for effecting the above-described operation during state "3." A gating circuit 84 is coupled between the output of the B register 14 and the input of the A register 12. An OR gate 86 is responsive to a control signal at the P3 output for causing the gate 84 to store the content of the B register 14 into the A register 12. Corresponding to the gate 84, a gate 88 is coupled between the Y and X registers and is controlled by an OR gate 90. Similarly, the OR gate 90 is responsive to the control signal at P3 for causing the gate 88 to store the content of the Y register into the X register. Referring to the AROF and BROF flip-flops, an OR gate 92 is coupled to the input of the AROF flip-flop which sets it into a "1" state. The OR gate 92 is responsive to a control signal at P3 for setting the AROF flip-flop to a "1" state. Also, an OR gate 94 is connected to the input of the BROF flip-flop which sets it into a "0" state. A control signal at P3 causes the OR gate 94 to set the BROF flip-flop into a "0" state.

At the end of state "3," the control counter 24 goes to states "4" and "5" forming control signals at the P4 and P5 outputs. During the states "4" and "5" the word in the stack of information contained in the memory 10 is read out and stored into the B register and the BROF flip-flop is set to a "1" state, indicating the B register is full. To this end, an OR gate 96 is responsive to a control signal at P4 to apply a control signal to the read input (R) of the memory 10 and to apply a control signal through the OR gate 98 to a gate 100. This causes the gate 100 to gate the address contained in the S register 18 to the memory 10 and causes the addressed memory location to be read out and stored into the information register 10a. The S register 18 always points to the top of the stack in memory, therefore, the top word of the stack in memory is read.

Also, the control signal at P4 causes a gate 102 to set the BROF flip-flop to a "1" state. The control pulse at P5 causes an OR gate 106 to apply a control signal to a gate 104. The gate 104 is responsive to this control signal to store the word contained in the information register 10a into the B register 14.

At the end of state "5," the control counter 24 goes to state "6" where the content of the S register 18 is counted down by one address to point at the next word of information in the corresponding stack. To this end, an OR gate 108 is responsive to the control signal at P6 to cause a count control circuit 110 to count the address contained in the S register 18 down by one address.

Following state "6," the control counter 24 goes to state "7" and forms a control signal at P7. During state "7" the content of the B register is checked to whether or not it contains a word of a double precision information unit (B[50:3]=010). If the word is a double precision information unit, then the control counter 24 goes to state "8." If, on the other hand, the word contained in the B register is part of a single precision information unit (B[50:3]=000), the counter is reset back to state "1." A decoding circuit 112 is coupled to the tag flip-flops 12a and 14a of the A register and B register. The decoding circuit 112 forms a control signal at the B[50:3]=010 output whenever the word contained in the B register is part of a double precision word and at the B[50:3]=000 output when part of a single precision information unit. Thus, a control signal at B[50:3]=010 (double precision) causes the control unit 24 to go from state "7" to state "8" whereas a control signal at B[50:3]=000 causes it to go back to state "1."

Assume that a double precision word is contained in the B register and hence a second word needs to be read from the stack in the memory. Information is arranged in the memory so that the least significant word of a double precision information unit is read from memory first, followed by the most significant word. Therefore, assuming a double precision information unit is being handled the B register now contains the least significant word thereof and must be transferred to the Y register.

During states "8" and "9," the content of the B register is transferred to the Y register and the next word in the stack is read from the memory and stored in the B register. To this end, a gate 114 stores the content of the B register into the Y register in response to a control signal from an OR gate 116. The OR gate 116 applies a control signal to the gate 114 in response to the control signal at P8. Initially the control signal at P8 also causes the OR gate 96 to apply a control signal to the read (R) input of the memory 10 and to the OR gate 98 which in turn applies a control signal to the gate 100. This causes the decremented address contained in the S register 18 to be used to address the memory 10 and causes the content of the addressed memory location to be read out to the information register 10a. The control counter goes to state "9" and the control pulse at P9 causes the OR gate 106 to cause the gate 104 to store the word contained in the information register 10a into the B register 14. Thus, at the end of state "9," the least significant word of a double precision information unit is stored in the Y register 15 and the most significant word is stored in the B register 14.

At the end of state "9" the control counter 24 goes to state "10" and the control signal at P10 causes the gate 108 to again activate the count control circuit 110 which in turn counts the address contained in the S register 18 down one unit. At the end of state "10" the control unit 24 goes back to state "1."

Once the control counter 24 is back in state "1" it will continue on through states "2" through "10" again or will go to an "adjust complete" state where a control signal is formed at the ADJ.C. output. The "adjust complete" state is only entered when both the A register and the B register are full as indicated by control signals at the output circuit ARO·BRO from the decoder 82. States "2" through "10" are entered again if initially the B register is empty.

It should now be evident that the ADD operator causes a stack adjust operation to take place without specifying whether the corresponding information is single or double precision. The circuits of FIGS. 2 and 3 automatically shift the information from the B register to the A register and causes information to be read from the memory 10 and stored into the B register 14 for single precision information. If, however, the decoder circuit 112 detects that the information is double precision, it causes the control counter 24 to enter states "8," "9" and "10" where another word is read from the memory and stored in the B register while the former information is transferred from the B register to the Y register. Therefore, the transfer gates and control circuits automatically handle the information in accordance with single precision or double precision, depending on the tags of the words stored in the B register.

Consider now the STACK ADJ (0,2) operation which occurs at the beginning of execution of a LOAD operator. Assume initially that a LOAD operator has been read from the memory 10 and stored in the operator register 28 causing a control signal at the LOAD-STACK ADJ(0,2) output. During the following discussion reference should be made to the flow diagram of FIG. 5 and the circuit diagram of FIG. 2.

The control signal at the LOAD-STACK ADJ (0,2) output causes the control counter 24 to enter state "20" where a check is made to see whether the A register is empty. If the A register is empty a control signal is formed at the ARO' output of the AROF flip-flop. When the A register is empty the STACK ADJ (0,2) operation is complete regardless of the condition of the B register. The reason being that STACK ADJ (0,2) indicates that any information contained in the A register is to be moved out thereof. Stating it differently, the stack needs to be adjusted down so that the A register is empty.

If the A register is full the AROF flip-flop is in a "1" state causing a control signal at the ARO output. This causes the control counter 24 to go from state "20" to state "21." During state "21" the B register is checked to see whether it is empty (BRO'). If the B register is empty then state "22" is entered where the content of the A register is stored in the B register, the content of the X register is stored in the Y register, the AROF flip-flop is set to a "0" state to mark that it is empty and the BROF flip-flop is set to a "1" state indicating that the B register is full.

Consider now the operation of the circuits shown in FIG. 2 during state "22." The control signal at P22 causes an OR gate 120 to activate a gate 122 causing it to store the content of the A register into the B register. Corresponding to the gates 120 and 122 are an OR gate 124 and a gate 127. The OR gate 124 causes the gate 127 to store the content of the X register into the Y register in response to the control signal at P22. The OR gate 126 is responsive to the control signal at P22 for resetting the AROF flip-flop into a "0" state. An OR gate 102 is responsive to the control signal at P22 for setting the BROF flip-flop into a "1" state.

Following state "22" the control counter 24 is set back to state "20" and at this point the A register is empty and a control signal is formed at the ARO' output. This causes the control counter 24 to enter the "adjust complete" state and form a control signal at the ADJ.C. output, causing the STACK ADJ (0,2) operation to be terminated.

Assume now that during state "21" of the control counter 24 it is found that the B register is full. A control signal being formed at the BRO output. This will cause the control counter 24 to go to state "23." During state "23" the content of the S register 18 is counted up by one address. To this end, an OR gate 129 is responsive to the control signal at P23 to cause a count control circuit 128 to count the address contained in the S register 18 up one address.

Subsequently, the control counter 24 goes to states "24" and "25" during which the content of the B register is stored into the memory 10 and the BROF flip-flop is set to a "0" state thereby marking the B register as empty.

Consider now the operation during states "24" and "25." The control signal at the P24 output causes a gate 130 to store the content of the B register into the information register **10*b*, and causes the OR gate 94 to reset the BROF flip-flop to a "0" state. The control signal at P25 causes an "OR" gate 132 to apply a control signal to the write (W) input of the memory 10 and to the OR gate 98. The OR gate 98 in turn causes the gate 100 to couple the address contained in the S address register to the memory 10 and the information contained in the information register 10*b*** is written into the addressed location.

Following state "25," the control counter 24 goes to state "26" where the circuits check to see whether or not the tag bits in the B register designate the information as double precision. If the tag bits in section **14*a* of the B register indicate that the information which has just been stored in the memory is double precision (B[50:3]=010), then state "27" is entered. If, on the other hand, the tag bits indicate that the information is single precision (B[50:3]=000), then the control counter 24** skips from state "26" to state "30."

Assume that the information that was just stored in the memory 10 is part of a double precision information unit and hence a word is contained in the Y register that needs to be stored into memory. The control signal at P27 causes the gate 129 to activate the count control circuit 128 which, in turn, counts the address contained in the S register 18 up one address. Thus, the S register 18 now points at an empty memory location. Subsequently, the control counter 24 goes to state "28" and then to state "29." The control pulse at P28 causes a gate 134 to store the content of the Y register into the information register **10*b* and the control signal at P29 causes the OR gate 132 to apply another control signal to the write (W) input of the memory 10 and to the OR gate 98. The OR gate 98 in turn causes the gate 100 to couple the incremented address from the S register to the memory. The memory then writes the word in the information register 106** (from the Y register) into the addressed memory location.

Subsequently the control counter 24 goes to state "30." During state "30" the content of the A register is transferred to the B register, the content of the X register is transferred to the Y register, the AROF flip-flop is set to a "0" state marking the A register as empty and the BROF flip-flop is set to a "1" state marking the B register as being full. To this end the control signal at P30 causes the gates 120, 122 and 124, 126 to store the content of the A and X registers into the B and Y registers and cause the OR gate 126 and the OR gate 102 to set the AROF and BROF flip-flops into states "0" and "1," respectively, similar to that described above.

The control counter 24 now returns to state "20" and then goes to the "adjust complete" state terminating the STACK ADJ (0,2) operation.

It can now be seen that the STACK ADJ (0,2) operation and corresponding circuitry respond to the tag bits contained in the B register 14 and causes the information to be handled as single or double precision, depending on the tag bits. Thus, the LOAD operator specifies that the information is to be adjusted in a certain manner in the A and B registers and the transfer circuitry and control circuitry described hereinabove automatically, in response to the tag bits, adjust the information as single or double precision, depending on the particular type of information.

The sequence of steps of the system shown in FIG. 2 during STACK ADJ (1,2) operation is shown in the flow diagram of FIG. 6. The STACK ADJ (1,2) operation takes place at the beginning of execution of a STORE operator. The operation of the system for a STACK ADJ (1,2) is such that the stack of information is adjusted so that the A register (and the X register, if double precision) is filled without regard to the content of the B register. The operation for a STACK ADJ (1,2) is easily understood with reference to the flow diagram of FIG. 6 and the explanation of symbols in Tables I, II, and III in the same manner as that described hereinabove for FIGS. 4 and 5 and will not be given in detail as was done for FIGS. 4 and 5.

Refer now to FIG. 7 which is a block diagram showing the circuits for execution of the ADD, LOAD and STORE operators. A number of the circuits shown in FIG. 2 are repeated again in FIG. 7 and common reference numerals are used therefor. In order to simplify the block diagram of FIG. 7, certain of the circuits essential for the execution of operators shown in FIG. 2 are not shown again in FIG. 7. For example, the instruction address counter 26, gate 34, control circuits 30, delay circuit 36, gate 38 order register 28 and decoder 32 are essential for obtaining, storing and decoding the operators. To be explained in more detail, the output of the decoder 32 is used at the appropriate places in the control unit shown in FIG. 8 which controls the operation of the circuits shown in FIG. 7.

Figure 8:
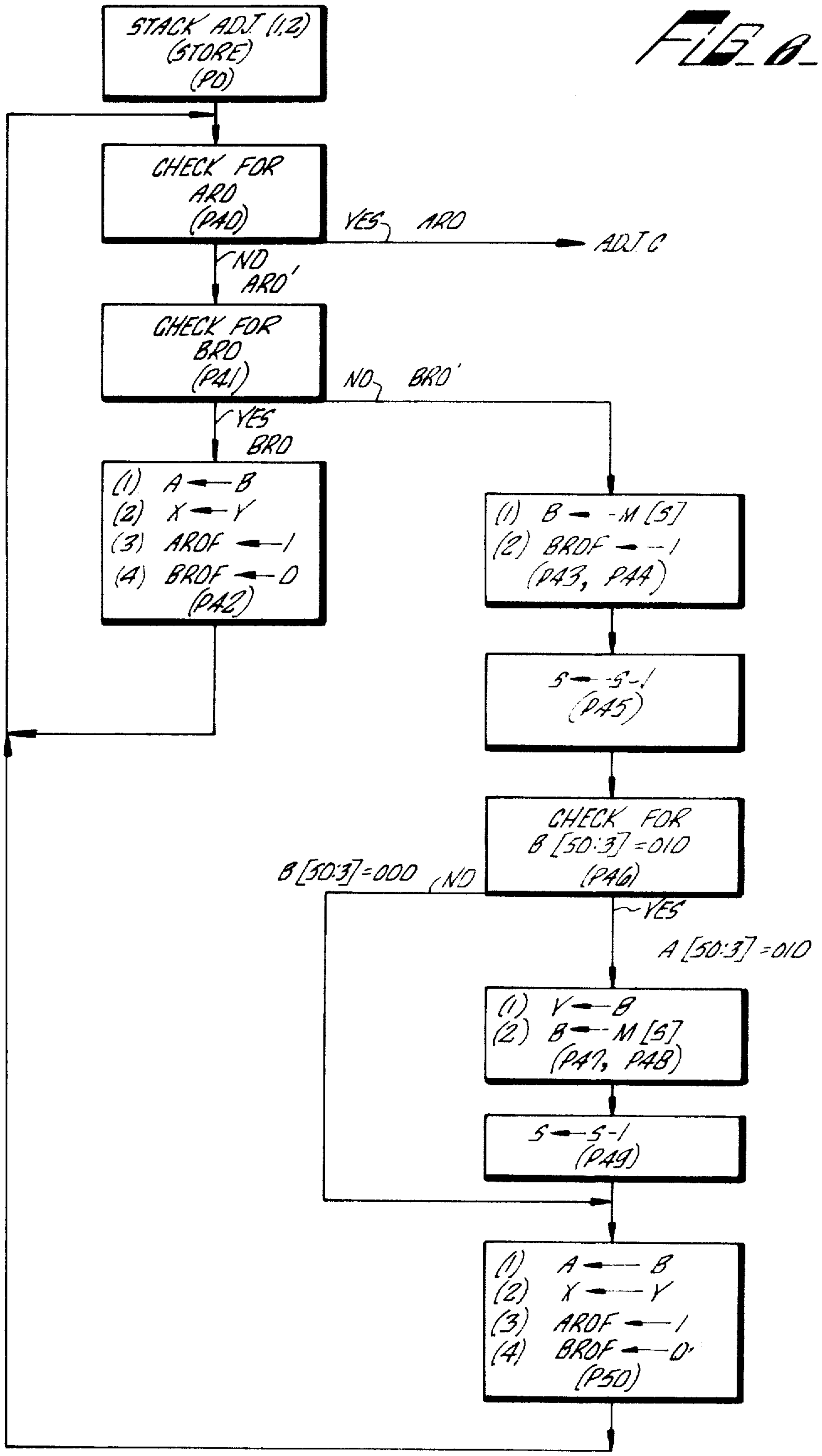
FIG. 8 is a block diagram of the control unit for the circuits shown in FIG. 7.
Figure 1:
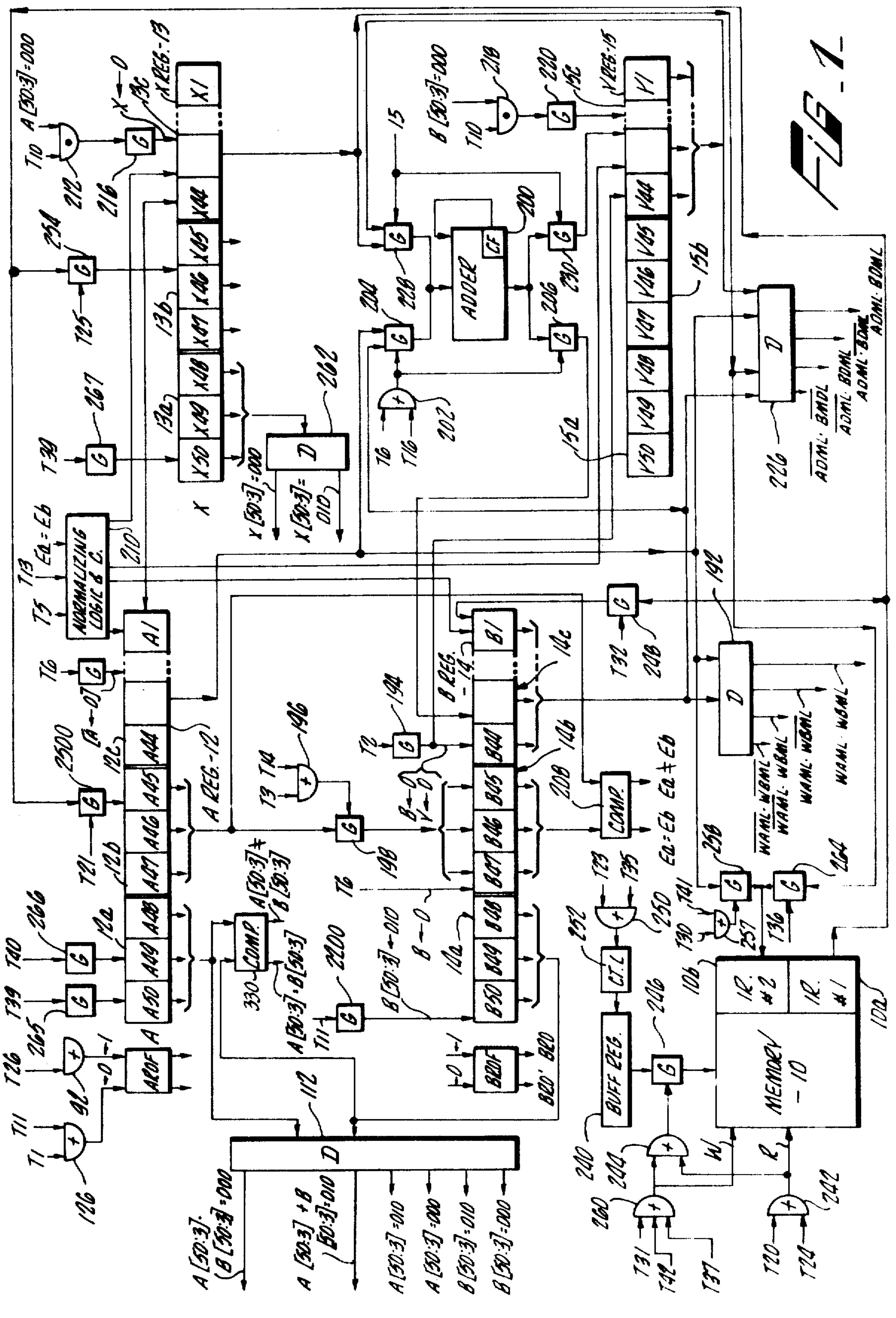
Figure 8:
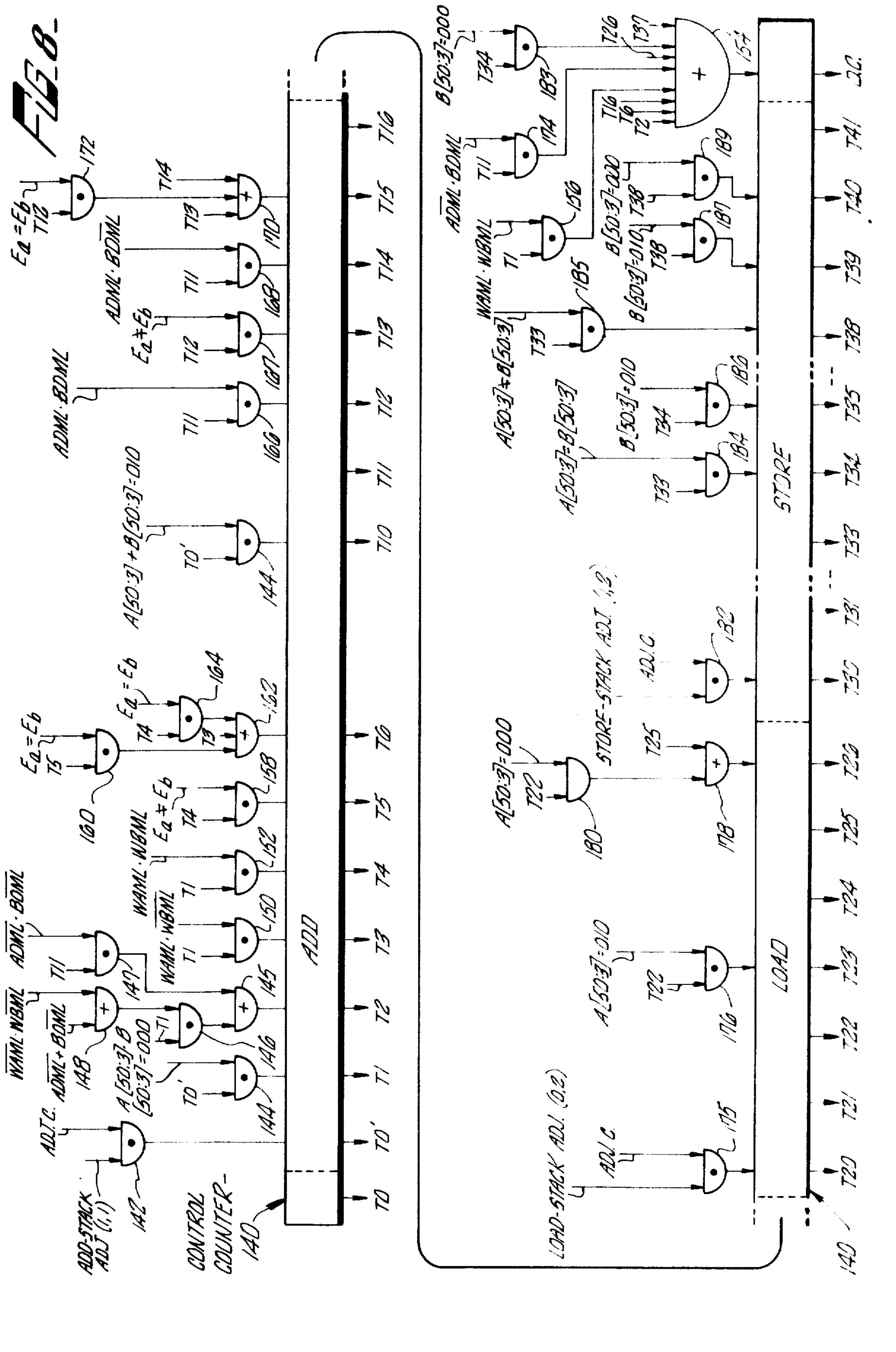
Figure 9:
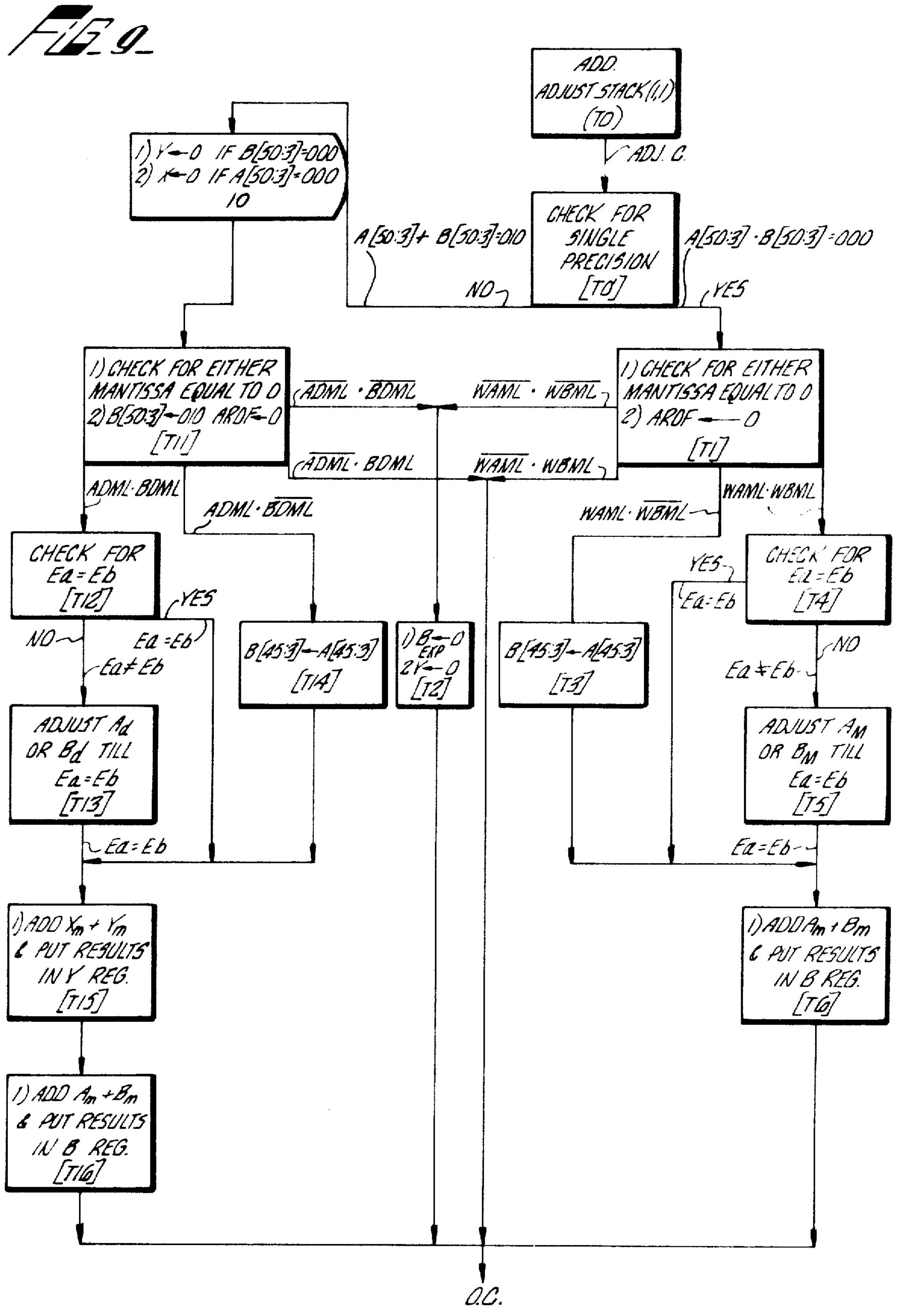
FIG. 9 is a flow diagram illustrating the sequence of operation of the circuits shown in FIG. 7 while executing an "ADD operator;"
Figure 11:
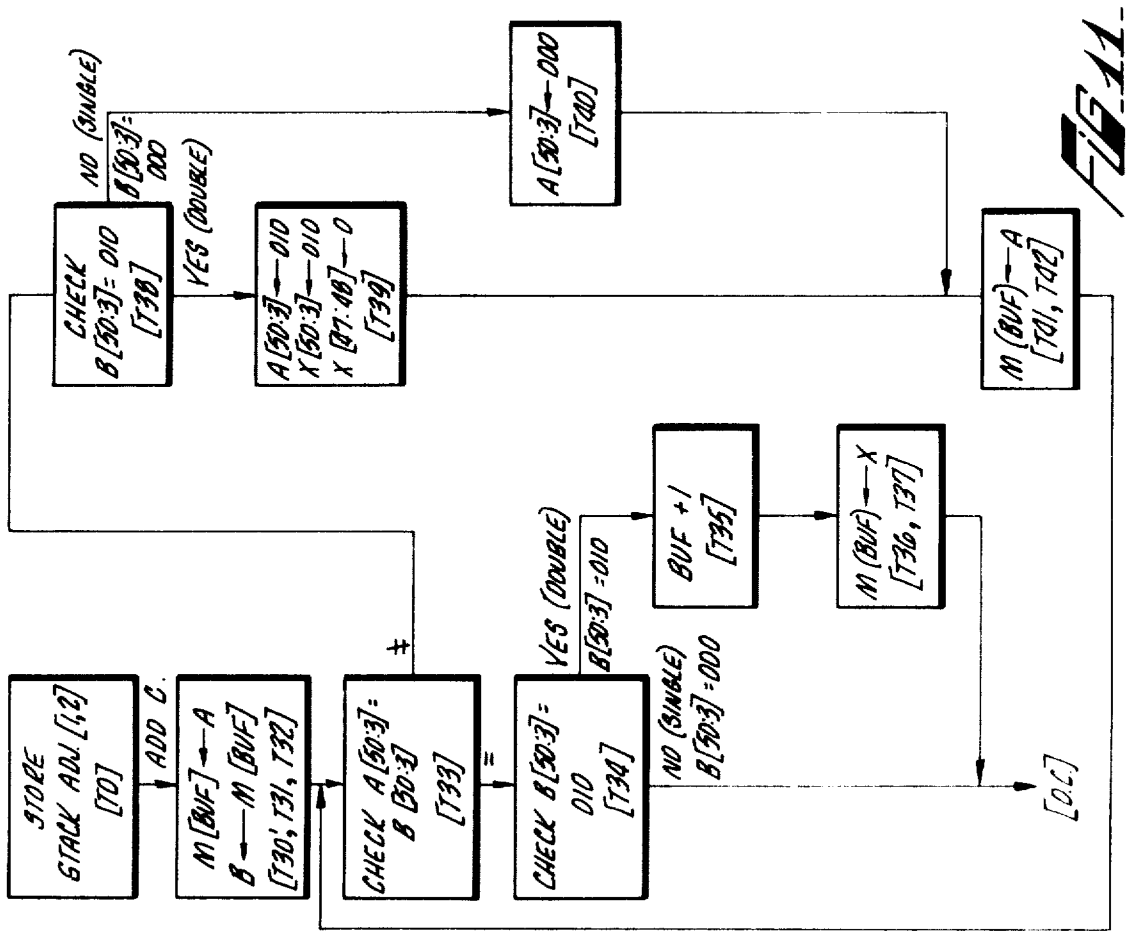
" and FIG. 11 is a flow diagram illustrating the sequence of operation of the circuits shown in FIG. 7 while executing a "STORE operator."
Figure 10:
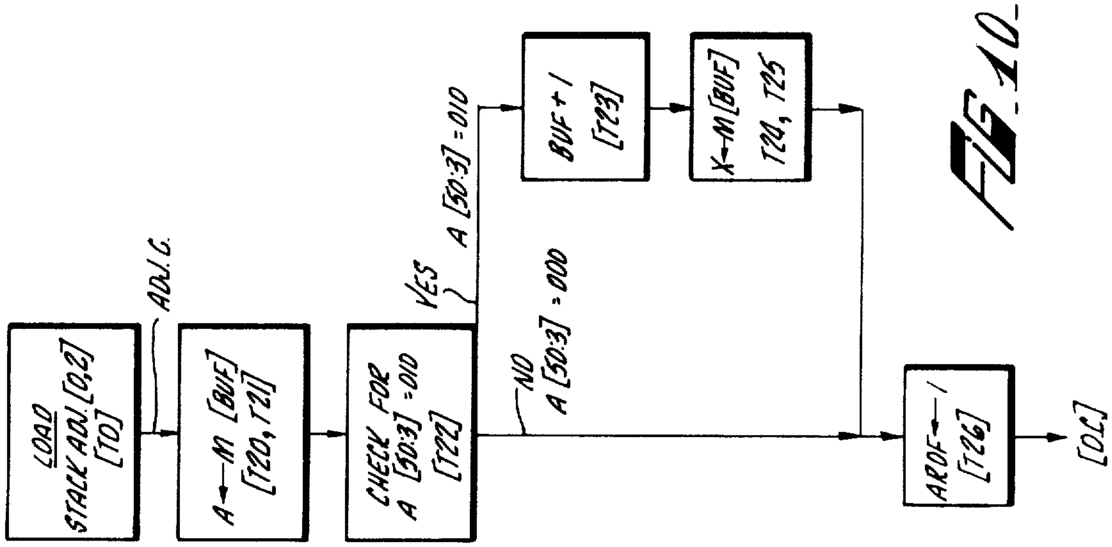
FIG. 10 is a flow diagram illustrating the sequence of operation of the circuits shown in FIG. 7 while executing a "LOAD operator.

Before considering the block diagram of FIG. 7 in detail, refer to the control circuits of FIG. 8 which control the operation of the system shown in FIG. 7 while executing ADD, LOAD and STORE operators. The control circuits of FIG. 8 are part of the control unit 20 shown in FIG. 1. Included therein is a control counter 140. The control counter 140 has a number of different states during which control signals are formed at the indicated output circuits. All of the outputs except one are referenced by the symbol "T" followed by a numeral that corresponds to the state of the counter 140 causing the control signal thereat. One output is represented by the symbol O.C. and receives a control signal when the counter 140 is in a unique state referred to as the "operation complete" state. The flow diagrams of FIGS. 9, 10 and 11 illustrate the sequence of operation of the control counter 140 as well as the operation of the circuits shown in FIG. 7.

It will be noted that some of the inputs to the circuits of FIG. 7 are from output circuits which are not shown in FIG. 7. These output circuits and the circuits to which they are connected are shown in FIGS. 2, 3 and 6 and will be referred to in connection with the operation of the circuits of FIG. 7. Refer now to the circuits of FIG. 7 for causing an ADD operator to be executed and to the flow diagram of FIG. 9 which symbolically describes the operation. Initially, the control counter 140 is in state "0" and forms a control signal at the output T0. The control signal at the ADD-STACK ADJ (1,1) output in combination with a control signal at the ADJ.C. output of the control counter 24 (see FIG. 3) causes an AND gate 142 to set the control counter 140 into state "0′" (to be distinguished from state "0"). The control counter 140 is set from state "0′" to one of two different states, namely, states " 1" or "10." If TO′information being operated on is single precision the control counter goes to state "1" and if the double precision, to state "10." TO′

The coincidence of control signals at the output circuits T0′ and A [50:3]·B[50:3]=000 cause the control counter 140 to be set from state "0′" into state "1." The coincidence of control signals at the output circuits T0′ and A[50:3]+B[50:3]=010 causes an AND gate 144 to set the control counter 140 from state "0′" to state "10."

Returning to state "1," the control counter 140 can go from state "1" to any one of states "2," "3," "4" or "operation complete" (O.C.). A control signal at the output circuit $\overline{WAML}\cdot\overline{WBML}$ (from FIG. 2) causes an OR gate 148 to apply a control signal to an AND gate 146. The AND gate 146 is responsive to such control signal in coincidence with the control signal at T1 to apply a signal through an OR gate 145 to the control counter 140 setting it into state "2."

An AND gate 150 is responsive to the coincidence of control signals at the output circuits T1 and $WAML\cdot\overline{WBML}$ for setting the control counter 140 to state "3." An AND gate 152 is responsive to the coincidence of control signals at T1 and WAML·WBML for setting the control counter 140 from state "1" to state "4."

An OR gate 154 is provided to set the control counter 140 into the "operation complete" state wherein a control signal is formed at the O.C. output. The OR gate 154 has an input connected to the output of an AND gate 156. The coincidence of control signals at the output circuits T1 and $\overline{WAML}\cdot WBML$ cause the AND gate 156 to apply a control signal through the OR gate 154 to the control counter 140 causing it to be set from state "1" to the "operation complete" state. The control counter 140 is operative for automatically going from the "operation complete" state back to state "0."

Once the control counter 140 is in state "2," the control signal at the T2 output causes the OR gate 154 to set it to the "operation complete" state.

Consider now state "3" of the control counter 140. Once the control counter 140 is in state "3," it automatically goes to state "6." To this end, an OR gate 162 is responsive to a control signal at the T3 output for setting the control counter 140 from state "3" to state "6."

Consider now state "4." When in state "4," the control counter 140 may either go directly to state "6" or to state "5" and then to state "6." An AND gate 158 is responsive to a control signal at the T4 output in coincidence with a control signal at the $Ea \neq Eb$ output for setting the control counter to state "5." Once in state "5," the coincidence of control signals at the T5 and $Ea=Eb$ outputs cause an AND gate 160 to apply a control signal through the OR gate 162 to the control counter, setting it from state "5" to state "6."

Refer again back to state "4." An AND gate 164 is responsive to the coincidence of control signals at the T4 and $Ea=Eb$ output for applying a control signal through the OR gate 162 to the control counter 140 setting it from state "4" to state "6."

Once the control counter 140 is in state "6," it automatically goes to the "operation complete" state. To this end, the OR gate 154 is responsive to the control signal at T6 for setting the counter into the "operation complete" state.

It should be noted that the operation of the control counter 140 up to this point for states "1" to "6" has been for single precision information. The operation of the control counter 140 for states "10" through "16" is for double precision information. The control counter is set from state "0'" to state "10" under control of the AND gate 144 as described hereinabove. Once in state "10" the control counter automatically counts to state "11."

During state "11" the control counter 140 goes to any one of four different states. An AND gate 166 is responsive to the coincidence of control signals at the T11 and ADML·BDML output circuits for setting the control counter 140 from state "11" to state "12." An AND gate 168 is responsive to the coincidence of control signals at the T11 and $ADML\cdot\overline{BDML}$ for setting the control counter 140 into state "14." An AND gate 174 is responsive to the coincidence of control signals at the T11 and $\overline{ADML}\cdot BDML$ output circuit for applying a signal through the OR gate 154 for setting the control counter 140 into the "operation complete" state.

An AND gating circuit 147 is responsive to a control signal at T11 in coincidence with a control signal at the $\overline{ADML}\cdot\overline{BDML}$ outputs for applying a control signal through the OR gate 145 and resetting the control counter to state "2."

Once the control counter is in state "12" it can either go to state "13" or to state "15." An AND gate 167 is responsive to the coincidence of control signals at the T12 and $Ea \neq Eb$ outputs for setting the control counter 140 into state "13." An AND gate 172 is responsive to the coincidence of control signals at the T12 and at $Ea=Eb$ outputs for applying a control signal through the gate 170 setting the control counter 140 into state "15." The OR gate 170 is responsive to the coincidence of control signals at T13 and T14 for setting the control counter from states "13" and "14," respectively, to state "15."Once the control counter is in state "15" it automatically counts to state "16." The OR gate 154 is responsive to a control signal at T16 for setting the control counter to the "operation complete" state.

Consider now the portion of the control counter shown in FIG. 8 for causing a LOAD operator to be executed. During the following discussion, reference should be made to FIGS. 8 and 10, FIG. 10 showing a flow diagram for execution of a LOAD operator.

An AND gate 175 is responsive to the coincidence of control signals at the LOAD-STACK ADJ (0,2) and ADJ.C. output for setting the control counter 140 into state "20." Once the control counter 140 is in state "20" it automatically counts to state "21" and then on to state "22."

Once the control counter 140 is in state "22" it either goes to state "23" or to state "26." An AND gate 176 is responsive to the coincidence of a control signal at the T22 and A[50:3] =010 outputs for setting the control counter 140 into state "23."An AND gate 180 is responsive to the coincidence of control signals at the T22 and A[50:3]=000 outputs for applying a control signal through an OR gate 178 to the control counter 140 setting it to state "26." The control counter, once in state "23," automatically counts to states "24" and "25."

The OR gate 178 is responsive to a control signal at the T25 output for setting the control counter 140 to state "26." The OR gate 154 is responsive to the control signal at T26 for setting the counter from state "26" to the "operation complete" state.

Consider now the portion of the control counter 140 of FIG. 8 which pertains to the STORE operator. Reference should be made during the following discussion to the STORE flow of FIG. 11 and the circuits of FIG. 8.

The control counter 140 is set from state "0" to state "30" by an AND gate 182. The AND gate 182 sets the control counter into state "30" in response to the coincidence of control signals at the output circuits STORE-STACK ADJ (1,2) and ADJ.C. Once in state "30," the control counter 140 counts to states "31," "32," "33."

Once the control counter 140 is in state "33," it either goes to state "34" or to state "38."

An AND gate 184 is responsive to the coincidence of control signals at the T33 and A[50:3]=B[50:3] outputs for setting the control counter 140 into state "34." An OR gate 185 is responsive to the coincidence of signals at T33 and A[50:3]≠B[50:3] for setting the control counter into state "38."

Once the control counter is in state "34" it can either go to state "35" or to the "operation complete" (O.C.) state. An AND gate 186 is responsive to the coincidence of control signals at the T34 and B[50:3]=010 outputs for setting the control counter 140 into state "35." Once in state "35" the control counter counts to states "35," "36," and "37."

The gate 154 is responsive to a control signal at T37 for setting the control counter from state "37" to the "operation complete" state.

An AND gate 183 is responsive to the coincidence of control signals at the T34 and B[50:3]=000 outputs for applying a control signal through the OR gate 154 to the control counter 140 setting it into the "operation complete" (O.C.) state.

Assuming the control counter has been set to state "38" it is set to one of states "39" and "40." An AND gate 187 sets the control counter from state "38" to state "39" in response to the coincidence of control signals at T38 and B[50:3]=010. An AND gate 189 sets the control counter from state "38" to state "40" in response to the coincidence of control signals at T38 and B[50:3]=000.

The control counter 140 automatically counts from states "37" and "40" to state "41." Once in state "41" the control counter 140 automatically counts to state "42" and back to state "33."

With the portion of the control unit shown in FIG. 8, in mind, consider the operation of the system shown in FIG. 7 which the control unit 140 sequences.

First, the operation of the computer system shown in FIG. 7 during the execution of an ADD operation will be described. During the following discussion reference should be made to the ADD flow diagram of FIG. 9 and the block diagram of FIG. 7.

Initially an ADD operator is read out from the memory 10 and stored into the ORDER register 28 (see FIG. 2). A decoder 32 decodes the ADD operator and provides a control signal at the ADD-STACK ADJ (1,1) output. Initially the stack is adjusted so that both the A and B registers are full in accordance with the ADJ.STACK (1,1) operation described hereinabove. When the stack has been adjusted, a control signal is formed at the ADJ.C. output as described hereinabove causing the control counter 140 to go from state "0" to state "0'."

Assume for the following discussion that the tag bits of the words contained in the A and B registers identify the corresponding words as part of a single precision information unit. During state "0'" a check is made to see if the information is single precision. If both words are single precision a control signal is formed at the A[50:3]· B[50:3]=000 output of the decoder 112 causing the control counter to go from state "0'" to state "1." The decoder 112 is shown in FIG. 7 and is the same decoder as is shown in FIG. 2 but with additional outputs pertinent to FIG. 7.

During state "1" a check is made to see if the mantissas of the words contained in the A and B registers are equal to zero and the AROF flip-flop is set to a "0" state to mark the A register as being empty. The A register is marked as being empty because during the subsequent states of the control counter 140 the contents of the A and B registers are combined and the results stored in the B register so that the content in the A register can be disregarded thereafter. To this end, the OR gate 126 (the same as the OR gate 126 of FIG. 2), is responsive to the control signal at T1 for setting the AROF flip-flop to a "0" state.

The control counter 140 branches from state "1" into one of four different states. The state into which the control counter goes is dependent on the value of the mantissas in the A and B registers. A decoding circuit 192 is coupled to the mantissa sections **12*c* and 14*c* of the A and B registers. If the mantissas contained in the A and B registers are both zero, the decoding circuit 192 forms a control signal at the $\overline{\text{WAML}}\cdot\overline{\text{WBML}}$ output and the control counter 140 branches to state "2." Since both mantissas are zero, the exponent contained in the B register is to be cleared to zero to reflect the zero value of the result. Also, the mantissa and exponent in sections 15*c* and 15*b* of the Y register are cleared to zero. The clearing of the Y register to zero is only of significance when handling double precision information, and not when handling single precision information. During the foregoing operation, a gate 194 is responsive to the control signal at T2 for setting the exponent and mantissa sections 14*b* and 14*c* and 15*b* and 15*c* of the B and Y registers to zero. Subsequently, the control counter 140** goes into the "operation complete" state forming a control signal at the O.C. output.

Assume now that the control unit 140 is back into state "1" and this time that the mantissa in the A register is zero but that the mantissa of the B register contains information and is not zero. This means that the operation of the system of FIG. 7 is complete and execution of the ADD operator is terminated. To this end, the decoder 192 forms a control signal at the $\overline{\text{WAML}}\cdot\text{WBML}$ output indicating that the A register is empty, whereas the B register contains information. This causes the control counter 140 to be set into the "operation complete" state and terminate the execution of the ADD operator.

Assume now that the control unit is back in state "1" again and this time that the A register contains information, whereas the B register contains a zero mantissa. The decoder 192 forms a control signal at the $\text{WAML}\cdot\overline{\text{WBML}}$ output causing the control counter to go from state "1" to state "3."

Since the mantissa in the B register is zero, whereas a nonzero mantissa is contained in the A register, the exponent of the word contained in the B register can be disregarded and the mantissa contained in the A register is transferred directly to the B register for use in making up the result of the addition. To this end, the exponent contained in **12*b* of the A register is transferred to 14*b* of the B register (B[45:3]←A[45:3]). To this end, an OR gate 196 is responsive to the control signal at T3 for applying a control signal to a gate 198 causing it to store the exponent contained in 12*b* of the A register to 14*b*** of the B register.

The control unit then goes from state "3" to state "6" where the mantissas contained in the A and B registers are added together and the result stored in **14*c* of the B register. A conventional full adder circuit 200 is provided for adding the mantissa contained in the A register to the mantissa contained in the B register. The adder 200 adds the mantissa of the A and B registers in parallel and provides a parallel output corresponding to the result. The signal at T6 causes an OR gate 202 to activate a gate 204 which couples the output of the mantissa sections 12*c* and 14*c* of the A nd B registers to the input of the adder 200. This causes the adder to add the content of 12*c* to 14*c* and provide an output corresponding to the sum. The OR gate 202 also applies a control signal to a gate 206 causing it to store the sum formed at the output of the adder 200 back into the mantissa section 14*c*** of the B register.

Following state "6" the control counter 140 goes to the "operation complete" state where the ADD operation is complete, leaving the sum in the B register.

Return now to state "1" of the control counter 140 and assume this time that the mantissas of the words in the A and B registers are both nonzero. The decoder 192 forms the control signal at the WAML·WBML output indicating that both mantissas are nonzero. This causes the control counter 140 to go from state "1" to state "4."

During state "4" a check is made to see if the exponents of the two words contained in the A and B registers are equal. A compare circuit 208 is provided for comparing the exponents contained in **12*b* and 14*b* of the A and B register. The compare circuit 208 forms a control signal at the output circuits $Ea=Eb$ and $Ea\neq Eb$ outputs whenever the exponents are equal and not equal, respectively. Assume that the exponents are equal and that the compare circuit 208 forms a control signal at the output $Ea=Eb$ during state "4." This causes the control counter 140** to go from state "4" to state "6" where the mantissas of the words contained in the A and B registers are added together as described hereinabove and the result is stored in the B register.

Assume that in state "4" the compare circuit 208 detects the exponents are not equal and the control signal is formed at the $Ea\neq Eb$ output. This causes the control counter 140 to go from state "4" to state "5".

During state "5" the position of the mantissas contained in the A and B registers are adjusted while the value of the exponents are modified by a corresponding amount until the exponents of the words contained in the A and B registers are equal. A conventional normalizing logic circuit 210 is provided for this purpose. Normalizing logic is well known in the computer art. One example of such logic is described in U.S. Pat. No. 3,244,864, assigned to the same assignee as the present application. The normalizing logic 210 causes the mantissas contained in the A and B registers to be shifted relative to each other automatically and the exponents modified by a corresponding amount until the exponents are equal. The normalizing logic and control circuit 210 is responsive to a control pulse at the T5 output for normalizing the words contained in the A and B registers.

Assume now that the mantissas of the two words are normalized and the exponents are equal and the compare circuit 208 forms a control signal at the $Ea=Eb$ output so indicating. This causes the control counter 140 to go from state "5" to state "6" where the two mantissas are added together and the result stored in the B register as described hereinabove.

Thus, the computer system of FIGS. 7 and 8 is responsive to a conventional add command, which does not specify whether the operand information is single or double precision. The operand words themselves contained in the A and B registers contain tag bits which identify the corresponding information unit as single or double precision. When the information is detected as single precision the system automatically goes from state "0" to states "1" through "6" where the information is handled as single precision information.

Assume now that the computer system is back in state "0" and this time the tag bits of either the word contained in the A register or the word contained in the B register identifies the corresponding information as double precision information. The decoding circuit 112 provides a control signal at the output circuit A[50:3]+B[50:3]=010 so indicating and the control counter 140 goes from state "0" to state "10".

During state "10" the X and Y registers are cleared to zero if the corresponding word in the A or B register is tagged as being single precision. This is done in order to eliminate any undesired information contained in the registers so that the double precision information contained in the other register can be added thereto.

The gates 216 and 220 cause the X and Y registers, respectively, to be set to zero. In other words, the entire content of the X and Y registers are cleared to zero by the gates 216 and 220. If the tag bits in 12*a* of the A register identifies the corresponding word as single precision information, the decoder 112 applies a control signal at the A[50:3]=000 output. This signal in coincidence with the control signal at T10 causes an AND gate 212 to apply a control signal to the gate 216 causing it to reset the content of the X register to zero. If the tag bits contained in the B register identify the corresponding word as single precision information, then a control signal is formed at the B[50:3]=000 output and this signal in coincidence with a control signal at T10 causes an AND gate 218 to activate the gate 220 which in turn sets the content of the Y register to zero.

Following state "10" the control counter 140 automatically goes to state "11" where a check is made to see whether the mantissa in either the A register or B register is equal to zero. Depending on the output of this determination, the control counter branches from state "11" to one of four states. Additionally, the control signal at T11 causes the OR gate 126 to reset the AROF flip-flop to a "0" state and causes a gate 2200 to set the tag bit flip-flops of the B register B50, B49 and B48 to states "0," "1," "0," respectively, thereby identifying the B register as containing double precision information. This is always done during state "11" because the result of the ADD operation is always stored in the B register and it has been determined, during state "0" that the information in either the A or B register is double precision, hence the result will be double precision.

Assume now that the mantissa contained in both the A and B registers and the extension thereof contained in the X and Y registers are zero. A decoding circuit 226 is coupled to the mantissa section of each of the registers, A, B, X and Y and provides a control signal at the output circuit $\overline{ADML}\cdot\overline{BDML}$ whenever the mantissas contained in all registers A, X, B and Y are zero. The control signal at the $\overline{ADML}\cdot\overline{BDML}$ causes the control counter 140 to go to state "2" where the content of the B register is set to zero and the content of the Y register is set to zero to represent the result, as described hereinabove. Following state "2" the control counter goes to the "operation complete" state.

Assume that the mantissas contained in the A and X registers are zero and that the mantissas contained in the B and Y registers are not zero. This causes the decoding circuit 226 to form a control signal at the ADML·BDML output causing the control counter 140 to go to the "operation complete" state. The "operation complete" state is entered at this point because the answer is now contained in the B and Y registers.

Assume that the control counter 140 is back in state "11" again and assume this time that the mantissas contained in the A and X registers are not zero but that the mantissas contained in the B and Y registers are zero. This will cause the decoding circuit 226 to form a control signal at the ADML·$\overline{BDML}$ output and cause the control counter to go from state "11" to state "14." Under these conditions the exponent contained in the A register must be transferred to the B register for use in the result word. To this end the control signal at the T14 output causes the OR gate 196 to activate the gate 198 causing gate 198 to transfer the exponent contained in the A register, exponent section 12*b* to section 14*b* of the B register.

Following state "14" the control counter 140 goes to state "15."a During states "15" and "16," the content of the X and Y registers and A and B registers are combined together and the result is stored in the Y and B registers. Consider now the operation during state "15." During state "15" the mantissas contained in the X and Y registers are combined together and the result is stored in the mantissa section 15*c* of the Y register. To this end, a gate 228 is responsive to the control signal at T15 for coupling the output of the mantissa sections 13*c* and 15*c* of the X and Y registers to the input of the adder 200. The adder 200 adds the two mantissas together and provides a signal corresponding to the result at the output. A carry flip-flop CF is provided in the adder 200 and stores any carry out from the adding of the two mantissas. Such a carry flip-flop and its connection to the adder 200 is well known in the computer art and the details thereof need not be given herein. A gate 230 is also responsive to the control signal at T15 for storing the sum of the mantissas into the mantissa section 15*c* of the Y register.

Following state "15," the control counter automatically goes to state "16" where the mantissas contained in the A and B registers are added together and stored into the mantissa section of the B register. To this end, the control signal at the T16 output causes the OR gate 202 to apply a control signal to the gates 204 and 206 causing the mantissas contained in the A and B registers to be added together adding in any carry as indicated by the carry flip-flop CF and the result is stored into the mantissa section of the B register. Following state "16" the control counter automatically goes to the "operation complete" state.

Consider now the condition where the control counter 140 is in state "11" and assume this time it is determined that the mantissas contained in the A and B registers are both nonzero. Under these conditions the decoding circuit 226 forms a control signal at the ADML·BDML output and the control counter 140 goes from state "11" to state "12" where the exponents of the two information units contained in the A, X and B, Y registers are compared for equal.

If the two exponents are equal, then the compare circuit 208 forms a control signal at the E*a*=E*b* output and the control counter 140 goes from state "12" to state "15," then on to state "16" where the content of the X, Y and A, B registers are added together and the result stored in the B and Y registers as described hereinabove.

If the control counter 140 is in state "12" and it is determined that the two exponents are not equal, the compare circuit 208 forms a control signal at the E*a*≠E*b* output causing the control counter 140 to go from state "12" to state "13." During state "13" the normalizing logic and control circuit 210 again causes the mantissas contained in the A and B registers to be normalized until the exponents contained in 12*b* and 14*b* are equal. When the exponents are equal, the compare circuit 208 forms a control signal at the E*a*=E*b* output causing the control counter 140 to go from state "13" to state "15" and subsequently to state "16" causing the contents of the A and X registers to be added to the contents of the B and Y registers and the result stored in the B and Y registers.

It should now be evident that tag bits stored in the words in the A and B registers identify the corresponding information as single or double precision. The programmer merely gives an ADD command and the circuits disclosed in FIGS. 7 and 8 automatically detect whether the tags identify the corresponding operands as single or double precision and if double precision appropriately combines the content of the X and Y registers as well as the A and B registers in accordance with the particular operator.

Consider now the execution of a LOAD operator, making reference to the LOAD flow diagram of FIG. 10 and the block diagram of FIG. 7. Assume that a LOAD operator has been stored into the ORDER register 28 and that a control signal is formed at the output circuit LOAD-STACK ADJ (0,2) output of the decoding circuits 32 (see FIG. 2). The purpose of LOAD operator is to cause information to be loaded into the A register and if it is double precision also into the X register.

At the beginning of the execution of the LOAD operator, a STACK ADJ (0,2) operation is performed as described hereinabove. ASsume now that a control signal is formed at the ADJ.C. output indicating that the stack has been completely adjusted as required for the particular operator. This causes the control counter 140 to go into state "20" and subsequently into state "21." During states "20" and "21" the content of the memory location addressed by an address buffer 240 is read out and subsequently stored into the A register. Assume now that the control signal is formed at the T20 output. This control signal causes an OR gate 242 to apply a control signal to the read (R) input of the memory 10 and through an OR gate 244 to a gate 246, causing the gate 246 to couple the address contained in the buffer register 240 to the memory 10. The read (R) signal causes the content of the addressed memory location to be read out and stored into the information register 10*a*. The control signal at the T21 output causes a gate 2,500 to store the word, read out from the memory 10, from the information register 10*a* into the A register.

Following state "21" the control counter 140 automatically goes to state "22" where a check is made to see if the information stored into the A register is double precision A[50:3] =010. This is done by the decoder 112 which looks at the tag bits stored in the tag bit flip-flops 12*a*. If the word is a single precision word, the decoding circuit 112 forms a control signal at the A[50:3]=000 output causing the control counter 140 to go from state "22" to state "26." The control signal at the T26 output causes the OR gate 92 (the same gate as is shown in FIG. 2) to apply a control signal to the AROF flip-flop setting it to a "1" state, thereby marking the register as containing information or, stating it differently, as being loaded in accordance with the LOAD operator. Following state "26," the control counter 140 goes to the "operation complete" state (O.C.).

Assume now that the control counter 140 is in state "22" but that this time the decoding circuit 112 detects that the word read from memory and stored in the A register is a double precision word A[50:3]=010. This causes the decoding circuit 112 to form a control signal at the A[50:3]=010 output and that the control counter goes from state "22" to state "23."a During state "23" the address contained in the buffer register 240 is counted up by one address. To this end, an OR gate 250 is responsive to the control signal at the T23 output for applying a control signal to a count control logic circuit 252. The count control logic circuit 252 in turn causes the address contained in the buffer register 240 to be counted up one address. Following state "23," the control counter 140 goes to states "24" and "25" in sequence. During states "24" and "25" the second word of the double precision word is automatically read out from memory and stored into the X register. To this end, the control signal at the T24 output causes the OR gate 242 to apply another control pulse to the read (R) input of the memory 10 and through the OR gate 244 to the gate 246. This causes the content of the memory location specified by the buffer register 240 to be read out and stored in the information register 10*a*. The following control signal at T25 activates a gate 254 which stores the information read from memory, and stored in the information register 10*a*, into the X register. Following state "25," the control counter 140 goes to state "26" where the AROF flip-flop is set to a "1" state by a gate 92 as described hereinabove, thereby marking the A and X registers as being loaded in accordance with the LOAD operator. Subsequently, the control counter 140 goes to the "operation complete" state causing the next operator to be read from memory and stored in the operator register.

It should now be evident that the tag bits of the operand word read from the memory and stored in the A register identifies the corresponding information unit as either being single or double precision. The programmer does not need to specify in the LOAD operator whether the information is single or double precision because the information itself specifies this condition of the information. If the tag bits specify that the information unit is double precision then this condition is detected and the circuits shown in FIG. 7 automatically read out the next word of the double precision unit for storage in the X register.

Consider now the execution of a STORE operator. During execution of a STORE operator, the contents of the A register and the contents of the X register, if a double precision information unit, are stored into the memory. Thus, the information contained in the A register (and possibly the X register) is to be stored into the memory and the AROF flip-flop is to be set to a "0" state indicating that the A register (and possibly the X register) are empty.

Assume that a STORE operator has been stored in the operator register 28 and that the decoding circuit 32 forms a control signal st the STORE-STACK ADJ (1,2) output (see FIG. 2). Also assume that a control signal is now formed at the ADJ.C. output indicating that the stack has been properly adjusted in accordance with the requirements of the STORE operator.

The control counter 140 automatically goes from state "0" to state "30" under these conditions and subsequently into the states "31" and "32."

During states "30," "31" and "32" the content of the A register is stored into the memory location specified by the address contained in the buffer register 240 and the prior word in such memory location is read out to determine if the precision of the particular field in which the information is being stored in memory is the same as the word being stored, (i.e. both single or double precision).

Returning to the operation, the control signal at T30 causes an OR gate 257 to activate a gate 258 which in turn stores the word contained in the A register into the information register 10*b*. The control signal at T31 causes an OR gate 260 to apply a control signal to the write input of the memory 10 and through the OR gate 244 to the gate 246. This causes the word stored in the information register 10*b* to be stored into the memory location specified by the address contained in the buffer register 240. The memory 10 is organized as described in the above-identified copending patent application entitled "DIGITAL MEMORY WITH AUTOMATIC OVERWRITE PROTECTION" for automatically reading out the content of the memory location at which the new word is to be stored and storing the former content into the information register 10*a*. Thus, following the control signal at T31 the previous content of the addressed memory location is contained in the information register 10*a*. The following control signal at T32 causes the gate 248 to store the content of the information register 10*a* into the B register. Thus, at the end of state "32" the B register contains the previous content of the memory location at which the word was just stored from the A register. Also, the A register still contains the word that was just written into memory and is retained for future use as explained hereinafter.

The control counter 140 now automatically goes to state "33."a State "33" is where the check is made of the tag bits contained in the A and B registers to see they are equal. A decision is made based on the outcome of the determination. If the precision of the word in A is the same as the field into which it is being stored (precision of word in B register) then states "34" through "37" are entered. If, on the other hand, the precision of the word in A is different than the precision of the field into which it is being stored (precision of word in B register) then states "38" through "42" are entered following which states "33" etc. are again entered.

FIrst, assume that the precision of the word stored in the A register (and also stored in memory) is found equal to the precision of the field into which it has been read (same as precision of word in the B register). Under these conditions state "34" will be entered where a check is made to see if single or double precision information is being operated on. If it is single precision information (B[50:3]=000) then the field in memory is correct and the "operation complete" (O.C.) state is entered. If, however, the information is double precision states "35" through "37" are entered where the second word of the double precision information in the A register is stored. This word is stored in the next higher memory location from the one into which the word in A was stored. Following this operation the "operation complete" (O.C.) state is entered.

Consider now the actual operation starting with state "33". The compare unit 300 will form a control signal at the A[50:3]b=B[50:3] output indicating the precision of the two fields are equal. This will cause the control counter 140 to go from state "33" to state "34."

In state "34" the check is made to see whether the two fields are single or double precision. If single, the decoder 112 forms a control signal at B[50:3]=000 and the control counter goes to the "operation complete" state (O.C.). If the fields are double precision then the decoder 112 forms a signal at B[50:3]a=010 and states "35" through "37" are entered. During state "35" the signal at T35 causes the OR gate 250 to activate the count logic 252 and count the address in the buff register up by one. During states "36" and "37" the signals at T36 and T37 cause a gate 264 to store the second, of the two, double precision words from the X register 13 into the information register **10*b* and cause this same word to be written into location specified by the incremented address in the BUF register 240**. Subsequently the "operation complete" state (O.C.) is entered.

Consider now the condition where in state "33" it is found that the precision of the information unit in the A register and X register is different from that of the memory field into which it is being written. Under these conditions state "38" is entered where a determination is made of whether the field in memory is single or double precision.

Assuming that the information unit contained in the A and X registers is double precision (2 words in length) and the memory field into which it is to be written is single precision, (one word of storage per information unit), the double precision information unit cannot be written without overwriting other information in memory. Under these conditions, the double precision information unit in the A and X registers is converted to a single precision information unit. The most significant word has already been transferred from the A register to memory and, to convert to a single precision information unit, the tag of the word in memory is changed from double precision to single precision. To this end, states "40" and then "41" and "42" are entered.

On the other hand, assuming that the information unit contained in the A and X registers is single precision but the memory field in memory is double precision, the information unit in the A and X registers is converted to double precision and stored in the memory. This is accomplished by changing the tag of the word transferred from the A register to memory to double precision and writing a word of all 0's in the next memory location. To this end, states "39," "41" and "42" are entered.

Return now to the actual operation beginning with state "38."a A signal at B[50:3]=000 indicates a single precision field in memory and causes state "40" to be entered. The word written in memory from the A register during states "30,"a "31" and "32" is still contained in the A register. In state "40" the control signal at T40 causes a gate 266 to set the tag flip-flops **12*a*** of the A register to all 0's, thereby indicating a single precision word. Although not shown herein, the double precision information unit contained in the A and X registers can be rounded off and the result stored in the A register at this point. The circuits for accomplishing this operation are now shown as they are not needed for a complete understanding of the invention.

The control signal at T40 also causes states "41" and "42" to be entered. The pulse at T41 activates the gate 258 via the OR gate 257 causing the word (with the correct tags) contained in the A register to be stored into the information register **10*b*. The signal at T42 activates the OR gate 260**, etc., causing the A word with the corrected tag bits to be stored at the same memory location as the former word.

Following state "42," "33" and "34" are again entered where checks are made to see if the tags are equal and if the information is single or double precision. The checks reveal the tags are now equal (note the content of the B register has not changed since such was read during states "30" through "32") and the information is single precision. Therefore, the control counter goes to the "operation complete" state (O.C.) following state "34."

Returning now to state "38" and consider now the condition wherein the check during this state reveals a double precision word. It will be recalled that state "38" is only entered if the precision of the information in the A (and X) registers is different from the memory field into which such information is to be written. A control signal is formed at B[50:3]=010 by the decoder 112. States "39," "41" and "42" will be entered causing the tag of the word stored in memory (from the A register) to be corrected from a single precision to a double precision tag.

To this end, the signal at T38 causes states "39" and "41" to be entered. The A register still contains the word stored in memory during states "30," "31" and "32." The signal at T39 causes a gate 265 to set the A register tag bits **12*a* into states 010 (representing double precision information) and causes a gate 267 to set the X register tag bits 13*a*** to states 010 and clear the rest of the X register to zero (X[47:48]←0). The following signals at T41 and T42 cause the corrected A word with the double precision tag to be written into memory at the same memory location in which the A word had previously been written. Subsequently, states "33" through "37" are entered during which the second of the double precision words (contained in the X register) is stored into the next sequential memory location in memory. The "operation complete" state (O.C.) is then entered and the execution of the STORE operator is complete.

It will again be noted that the tag bits in each operand cause the general operation specified by an operator to be carried out as required on either single precision or double precision operands. The programmer need not specify single or double precision in his program as the hardware automatically handles the information as specified by the tag bits in the operands.

One embodiment of the present invention has been shown. It will be understood that this embodiment of the invention has been shown by way of example only and that there are many other rearrangements and modifications of the embodiment within the scope of the present invention, as defined in the following claims.

Table I

| Operators | |
|---|---|
| ADD | ADD content of A to B (and X to Y if double precision) and store result in B (and Y, if double precision) |
| LOAD | LOAD an information unit from memory into A (and X if double precision) |
| STORE | STORE content of A (and X if double precision into memory) |

Table II

| Symbols | |
|---|---|
| A[50:3]=000 | The tag flip-flops A50, A49, A48 are in states 000, respectively, and identify a single precision information unit |

Table II – Continued

| | |
|---|---|
| A[50:3]=010 | The tag flip-flops A50, A49, A48 are in states 010, respectively, and identify a double precision information unit |
| B[50:3]=000 | The tag flip-flops B50, B49, B48 are in states 000, respectively and identify a single precision information unit |
| B[50:3]=010 | The tag flip-flops B50, B49, B48 are in states 010, respectively, and identify a double precision information unit |
| X[50:3]=000 | The tag flip-flops X50, X49, X48 are in states 000, respectively, and identify a single precision information unit |
| X[50:3]=010 | The tag flip-flops X50, X49, X48 are in states 010, respectively, and identify a double precision information unit |
| A[50:3] B[50:3]=000 | The tag flip-flops A50, A49, A48 and the tag flip-flops B50, B49, B48 are both in states 000 and both identify a single precision information unit |
| A[50:3]+B[50:3]=010 | The tag flip-flops A50, A49, A48 and/or the tag flip-flops B50, B49, B48 are in states 010 and, therefore, identifies a double precision information unit |
| $\overline{WAML}$ | mantissa in A register equals 0 |
| $\overline{WBML}$ | mantissa in B register equals 0 |
| ADML | double mantissa in A and X registers equals 0 |
| $\overline{BDML}$ | double mantissa in B and Y registers equals 0 |
| Ea | exponent of information unit in A register |
| Eb | exponent of information unit in B register |
| Ad | double length mantissa in A register and X register |
| Bd | double length mantissa in B register and Y register |
| Am | mantissa in A register |
| Bm | mantissa in B register |
| Xm | mantissa in X register |
| Ym | mantissa in Y register |
| | equal |
| ≠ | does not equal |

Table III

Action Symbols

| | |
|---|---|
| STACK ADJ (1,1) | Adjust stack until A and B registers (and X and Y registers if double precision) are full |
| STACK ADJ (0,2) | Adjust stack until the A register (and X register if double precision) is empty. B and X registers can be full or empty |
| STACK ADJ (1,2) | Adjust stack until A register (and X register if double precision) is full. B and Y registers can be full or empty |
| ADJ.C. | Stack adjust is complete |
| A←B | Transfer content of B register to A register |
| B←A | Transfer content of A register to B register |
| Y←B | transfer content of B register to Y register |
| X←Y | Transfer content of Y register to X register |
| Y←X | Transfer content of X register to Y register |
| B←0 | Set the B register to all 0's |
| X←0 | Set X register to all 0's |
| Y←0 | Set Y register to all 0's |
| B[50:3]←010 | Set the tag flip-flops B50, B49, B48 to 010, respectively |
| B[45:3]←A[45:3] | Transfer exponent in A register flip-flops A47, A46, A45 to B register flip-flops B47, B46, B45 |
| AROF←0 | Set AROF to 0 |
| AROF←1 | Set AROF to 1 |
| BROF←0 | Set BROF to 0 |
| BROF←1 | Set BROF to 1 |
| A←M[BUFF] | Read out content of memory location designed by BUFF register and store in A register |
| M[BUFF]←A | Write content of A register into memory location designated by BUFF register |

Table III – Continued

| | |
|---|---|
| B←M[S] | Read content of memory location designated by S register and store in B register |
| M[S]←B | Write content of B register into the memory location designated by the S register |
| M[BUFF]←X | Write content of X register into memory location designated by BUFF register |
| X←M[BUFF] | Read out content of memory location designated by BUFF register and store in X register |
| M[S]←Y | Write content of Y register into the memory location designated by the S register |
| BUFF+1 | Count address in BUFF register up one address |
| S←S−1 | Count address in S register down one address |
| S←S+1 | Count address in S register up one address |

What we claim is:

1. In a data processing apparatus the combination comprising, register means for storing a first word and an extension word of the same information unit for processing, said information unit having as a part thereof a tag which identifies whether the corresponding information unit contains an extension word, means for processing a word stored in said register means and including means responsive to said tag in an information unit identifying an extension word for automatically processing the extension word thereof together with the first word and thereby form a result having a double word length.

2. In a data processing apparatus as defined in claim 1 wherein said information unit contains said tag in the first word and wherein said register means comprises a first register for storing a first word for processing and an extension register for storing an extension word for processing, decoding means coupled to said first register for providing a predetermined signal when the tag therein identifies an extension word, said processing means being responsive to said predetermined signal for processing the word stored in said extension register.

3. In a data processing apparatus as defined in claim 2 wherein said processing means comprises an adder and gating means for coupling a word contained in said extension register means to said adder in response to said predetermined signal.

4. In a data processing apparatus for processing information of a single or a double word length, the combination comprising, a register for storing a first word for processing, an extension register for said register in which an extension of said first word may be stored for processing, said first word having a tag which identifies whether the corresponding information is a single word or is a double word having an extension word, storage means for storing an operator identifying an operation to be performed on said first word, means for processing the first word in said register in accordance with a stored operator, said processing means including means responsive to the tag in the word being processed indicating that an extension word is stored in the extension register for automatically processing such extension word together with the first word and thereby form a result having a double word length.

5. In a data processing apparatus for processing information units of a single or a double word length, the combination comprising, first and second registers for storing first and second words of an information unit for processing, an extension register for each of said registers in which an extension of each of said words may be stored for processing, each of said first and second words having a tag which identifies whether the corresponding information unit is a single word or is a double word having an extension word, storage means for storing an operator identifying an operation to be performed on said first and second words, means for processing the content of said first and second registers in accordance with a stored operator, said processing means including means responsive to the tag in one or the other or both of said first and second registers indicating the an extension word is stored in the corresponding register for automatically processing such extension word which in present together with the first and second words and thereby form a result having a double word length.

6. In a data processing apparatus as defined in claim 5 including detection means coupled to said first and second register means for detecting a tag identifying a double word, said processing means comprising gating means for coupling the words in said first and second registers to said processing means and for storing the result formed by the processing means into the second register, said gating means additionally being responsive to such detection for coupling the extension words in said extension registers to said processing means and for storing the result formed by said processing means into the extension register for said second register and thereby cause a double word length result to be stored in the second register and the corresponding extension register.

7. In a data processing apparatus for storing into memory, the combination comprising register means for storing a first word and an extension word forming an information unit, said information unit having a tag which identifies an extended word length information unit, memory means for storing information units from said register means, word by word an means operative for transferring a single word from said register means to said memory means and operative in response to said tag in an information unit identifying an extended word length for transferring an extension word from said register means to said memory means and thereby cause an extended information unit to be stored into the memory means.

8. In a data processing apparatus as defined in claim 7 including an operator register for storing operators for execution, said means for transferring being operative in response to a store operator for transferring a single word from said register means to said memory means for storage, said transfer means including means additionally responsive to said tag in an information unit stored in said register means for additionally transferring such extension word to the memory means for storage.

9. In a data processing apparatus for storing into a memory information unit of single or double word lengths, the combination comprising a first register for storing a word, an extension register for storing an extension of said word, said first word having a tag which identifies whether the corresponding information unit is of a single or a double word length, memory means, means for detecting a tag in said first register indicating a double word length information unit, means operative for only storing a single word from said first register into said memory in the absence of a detection by said detection means and operative in response to such detection for additionally storing a word contained in said extension register into said memory means and thereby cause a double word information unit to be stored into the memory means.

10. In a data processing apparatus for loading into registers for processing information units of single or double lengths, the combination comprising a first register for storing a word, an extension register for storing an extension of said word, said word having a tag which identifies whether the corresponding information unit is of a single or a double word length, memory means for storing words and extension words, means for reading out a word from said memory means and including means for storing such word in the first register means, means for detecting a tag in said first register indicating a double word length information unit, said reading means additionally being operative in response to said detection by said detection means for reading out a second word from said memory means and for storing the same in said extension register and thereby cause automatic storing of a double length information unit.

11. In a data processing apparatus, the combination comprising register means for storing an information unit, memory means, said register means having a register for storing a word for processing and a second register for storing a second word when the information unit is of a double word length, an information unit in said register means having a tag as a part thereof which identifies it as single or double word length information, and means for transferring a word of an information unit between the memory means and said register means and responsive to a tag in such word indicating double word length information for automatically transferring a second word therebetween.

12. In a data processing system as defined in claim 11 including means coupled to said first and second register means for detecting a tag therein indicating a double word length information unit and for providing a signal to said transfer means causing the transfer of double word length information.

13. In a data processing system as defined in claim 11 including means responsive to an operator stored in said operator register means for providing a unique signal to said transfer means indicative of a required transfer between each register means and the memory means and thereby cause the transfer means to selectively transfer at least a single word between said register means and said memory means and means responsive to a tag contained in an information unit stored in said register means indicating double word length information for applying a signal to said transfer means causing a second word to be transferred between said register means and said memory means.

14. In a data processing apparatus for processing information of a single or a double word length in a stack of information, the combination comprising first and second register means for storing the top two information units of a stack of information, memory means for storing the rest of the information units of such stack, each of said register means having a register for storing a word for processing and a second register for storing a second word when the corresponding information unit is of a double word length, an information unit stored in said first and second register means having a tag as a part thereof which identifies it as single or double word length, processing means for the information stored in said first and second register means, register means for storing an operator for controlling the operation of said processing means, and stack adjust means for transferring a word of an information unit between the memory means and said register means and responsive to a tag bit in the information unit indicating double word length information for automatically transferring a second word therebetween.

15. In a data processing apparatus for processing information of a single or a double word length in a stack of information, the combination comprising first and second register means for storing the top two information units of a stack of information, memory means for storing the rest of the information units of such stack, each of said register means having a register for storing a word for processing and a second register for storing a second word when the information unit is of a double word length, a word stored in said first and second register means having a tag as a part thereof which identifies it as part of single or double word length information, processing means for the information stored in said first and second register means, register means for storing an operator for controlling the operation of said processing means, and stack adjust means for transferring information between said register means and the memory means comprising means for reading a word from said memory means and for storing such word in one of said register means, means for detecting a tag in the stored word indicating double word length information, and means responsive to such detection for reading a second word from said memory means and for storing such second word in the same register means thereby forming double word length information therein.

16. In a data processing apparatus for processing information of a single or a double word length in a stack of information, the combination comprising first and second register means forming the top two information units of a stack of information, memory means for storing the rest of the information units of such stack, each of said register means having a register for storing a word for processing and a second register for storing a second word when the information unit is of a double word length, a word stored in said first and second register means having a tag as a part thereof which identifies it as part of single or double word length information; processing means for the information stored in said first and second register means; register means for storing an operator for controlling the operation of said processing means, and stack adjust means for transferring information between said register means and said memory means comprising means for transferring a word from one of said register means to said memory means, means for detecting a tag bit in such word indicating double word length information, and means responsive to such detection for automatically transferring a second word from the same register means to said memory means and thereby cause double word length information to be stored.

17. In a data processing apparatus for processing information of a single or a double word length in a stack of information the combination comprising first and second register means forming the top two information units of a stack of information; memory means for storing the rest of the information units of such stack, each of said register means having a register for storing a word for processing and a second register for storing a second word when the information unit is of a double word length, a word stored in said first and second register means having a tag as a part thereof which identifies it as part of single or double word length information, processing means for the information stored in said first and second register means; register means for storing an operator for controlling the operation of said processing means; and stack adjust means selectively responsive to an operator for transferring information between said register means and said memory means comprising means for transferring a word contained in a register of said register means to said memory means, means for detecting a tag in such word indicating double word length information, and means responsive to such detection for transferring a second word from the other register in such register means to said memory means for storage and thereby automatically effect the storage of double word length information.

18. In a data processing apparatus for processing information of a single or a double word length in a stack of information arranged on a last in, first out, basis the combination comprising memory means for storing information in stacks, counting means for automatically providing an indication of the memory location containing the top of a stack of information in said memory means, first and second registers external to said memory means for storing the first and second words in the top of the stack, each of said words in the stack having a tag which identifies whether the corresponding word is a single or is a double word; an extension register for each of said first and second registers for storing a second word of double word length information, register means for storing operators, means for automatically moving information between said first and second registers and the stack in said memory means as specified for a particular stored operator including means for detecting a tag in a word stored in said first and second registers and for providing an indication of double word length information, and transfer means responsive to said indication for automatically transferring another word between the memory location of said memory means indicated by said counting means and the corresponding extension register and thereby cause double word length information to be transferred.

19. In a data processing system, the apparatus comprising:
- a memory having a plurality of addressable locations for storing information units, each information unit comprising at least one word having an associated tag which indicates whether the information unit is a first type having a single word or a second type having a plurality of words;
- addressing means for selecting a memory location storing a word of an old information unit;
- register means for temporarily storing a new information unit to be stored in memory;
- means for obtaining the tag of the word in the memory location selected by said addressing means;
- means responsive to the tag of the word obtained from memory for indicating the type of word formerly stored in the selected memory location;
- means responsive to said indication for storing in the selected memory location a word contained in said register means together with a tag of the same type as that formerly in the selected memory location.

20. In a data processing system as defined in claim 19 wherein the information unit of the second type is two words in length and said addressing means comprises an address register which can be incremented, and additionally comprising
- means operative in response to an indication that the word obtained from the memory location selected by the address register is of the second type for incrementing said address register and
- means for storing a second word of the new information unit into the memory location selected by the address register as incremented.

21. In a data processing system as defined in claim 19 comprising
- means operative in response to the tag contained in the new information unit stored in said register means for indicating whether the new information unit is of the first type or of the second type;
- means operative in response to indications that the word obtained from the memory location selected by the address register is of the second type and the new information unit is of the first type for converting the new information unit to two words in length, means for incrementing the address register, means for storing the two words of the converted information unit into the memory locations identified by the address register before and after incrementing.

22. In a data processing system as defined in claim 19 comprising
- means responsive to the tag contained in the new information unit for indicating the type of information unit,
- means operative in response to indications that old information unit is of the first type and the new information unit is of the second type for changing the tag of the new information unit to the first type of tag, and means for storing a word of the new information unit together with the changed tag in the memory location selected by the address register.

23. In ad data processing system for storing information units into memory, the combination comprising:
- memory means having a plurality of addressable memory locations for storing information units word by word, each information unit comprising at least one word and having an associated tag in at least one word, a first type of tag identifying the information unit as a single word type and a second type of tag identifying the information unit as a double word type;
- register means for temporarily storing new information units which are to replace old information units stored in said memory;
- means for indicating whether the old information unit contains an old tag of the first type or of the second type;
- means for indicating whether the new information unit contains a new tag of the first type or of the second type;
- means operative in response to indications that said tags are of the same type for replacing the old information unit with the new information unit;
- means operative in response to indications that the old tag is of the second type and that the new tag is of the first type for converting the new information unit from the first type to its equivalent information unit of the second type and means for replacing the old information unit with the converted new information unit; and means operative in response to indications that the old tag is of the first type and that the new tag is of the second type for converting the new information unit to an information unit of the first type and for replacing the old information unit with the converted information unit.

24. In a data processing system as defined in claim 23 wherein the old tag indicating means comprises comparing means for indicating whether the old tag differs from the new tag.

25. In a data processing system as defined in claim 23 wherein the new tag indicating means comprises comparing means for indicating whether the tag differs from the new tag.

PO-1050
(5/69)

UNITED STATES PATENT OFFICE
CERTIFICATE OF CORRECTION

Patent No. 3,593,312 Dated July 13, 1971

Inventor(s) Robert S. Barton, Carl B. Carlson, Bobby A. Creech, Benjamin A. Dent, Erwin A. Hauck It is certified that error appears in the above-identified patent and that said Letters Patent are hereby corrected as shown below:

IN THE SPECIFICATION:

Column 4, line 58, "12b" should be --14a--;

Column 6, line 61, "ARO·BRO" should be --$\overline{\text{ARO}\cdot\text{BRO}}$--;
line 62, "ARO·BRO" should be --$\overline{\text{ARO}\cdot\text{BRO}}$--;
line 70, "sequences" should be --sequence--;

Column 7, line 25, after "(0,2)" add --and--;
line 53, after "B[50:3]" delete --a--;

Column 8, line 65, delete "flip-flops" and insert --registers--;

Column 9, line 17, delete "is" and insert --are--;

Column 13, line 48, delete "126" and insert --127--;
line 59, change "causes" to --cause--;

Column 14, line 12, after "38" add a --,--;
line 38, delete "6" and insert --8--;
line 51, delete "TO" and insert --the--;
line 52, delete "the";
line 53, delete "TO";

Column 15, line 29, change "output" to --outputs--;

Column 16, line 39, delete "OR" and insert --AND--;
line 49, delete ""35,"";

Column 18, line 34, delete "outputs";

Column 19, line 1, change ""0"" to --"0'"--;
line 7, change ""0"" to --"0'"--;
line 23, change ""0"" to --"0'"--;
line 59, change "ADML to --$\overline{\text{ADML}}$--;

PO-1050
(5/69)

UNITED STATES PATENT OFFICE
CERTIFICATE OF CORRECTION

Patent No. 3,593,312 Dated July 13, 1971

Inventor(s) Robert S. Barton, Carl B. Carlson, Bobby A. Creech
Benjamin A. Dent, Erwin A. Hauck It is certified that error appears in the above-identified patent and that said Letters Patent are hereby corrected as shown below:

Column 20, line 2, before "During" delete --a--;

Column 21, line 3, change "ASsume" to --Assume--;
line 42, after "and" delete --that--;
delete "goes" and insert --to go--;
line 71, change "identifies" to --identify--;
change "either being" to --being either--;

Column 22, line 57, before "State" delete --a--;

Column 23, line 2, after "A" add --and X--;
change "register" to --registers--;
line 8, after "A[50:3]" delete --b--;
line 16, after "B[50:3]" delete --a--;
line 60, after ""30,"" delete --a--;
line 67, change "now" to --not--;

Column 24, line 1, after ""42"," insert --states--;
line 9, change "Returning" to --Return--;

IN THE CLAIMS:

Column 27, line 3, after "indicating" delete "the" and insert --that--;
line 5, change "in" to --is--;
line 25, change "an" to --and--;

Column 30, line 50, delete"ad" and insert --a--;

Signed and sealed this 30th day of May 1972.

(SEAL)
Attest:

EDWARD M.FLETCHER,JR.
Attesting Officer

ROBERT GOTTSCHALK
Commissioner of Patents